US012259935B2

(12) United States Patent
Tholfsen et al.

(10) Patent No.: US 12,259,935 B2
(45) Date of Patent: Mar. 25, 2025

(54) ONLINE LEARNING PLATFORMS WITH ENHANCED SEARCH ASSIGNMENTS

(71) Applicant: Microsoft Technology Licensing, LLC, Redmond, WA (US)

(72) Inventors: Michael Tholfsen, Newcastle, WA (US); Paul Ronald Ray, Kirkland, WA (US); Jonathan Thomas Grudin, Issaquah, WA (US); Sadiq Dhafir Alkhalili, Burnaby (CA); Jason James Geiger, Snohomish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 2 days.

(21) Appl. No.: 18/148,563

(22) Filed: Dec. 30, 2022

(65) Prior Publication Data

US 2024/0220553 A1    Jul. 4, 2024

(51) Int. Cl.
*G06Q 50/20*     (2012.01)
*G06F 3/04817*   (2022.01)
(Continued)

(52) U.S. Cl.
CPC ........ *G06F 16/9535* (2019.01); *G06F 3/0482* (2013.01); *G06F 3/0484* (2013.01);
(Continued)

(58) Field of Classification Search
CPC .. G06F 16/9535; G06F 3/0482; G06F 3/0484; G06F 16/9538; G06F 3/04817; G06Q 50/20
See application file for complete search history.

(56) References Cited

U.S. PATENT DOCUMENTS 8,037,042 B2   10/2011   Anderson et al.
8,099,412 B2   1/2012    Yan et al.
(Continued)

FOREIGN PATENT DOCUMENTS

JP    2006079454 A    3/2006

OTHER PUBLICATIONS

November, Alan, "Mission Critical: How Educators Can Help Save Democracy", Retrieved From: https://novemberlearning.com/article/mission-critical-educators-can-help-save-democracy/, Dec. 22, 2016, 5 Pages.

(Continued)

*Primary Examiner* — Cheyne D Ly

(57) ABSTRACT

A computing device executing software displays a view of a search assignment in a user interface to a learning platform. The device receives user input comprising search terms associated with the search assignment, and generates queries based on the user input. The device submits the queries to a search engine, whereupon the search engine performs searches based on the queries, and the device displays the results. As a user evaluates resources provided in the results, the device updates the user interface to include an option selectable for adding evaluated ones of the resources to a collection of resources for the search assignment. In response to the user selecting the option with respect to a resource of the evaluated ones of the resources, the device adds the resource to the collection of resources.

20 Claims, 26 Drawing Sheets

(51) Int. Cl.
  *G06F 3/0482* (2013.01)
  *G06F 3/0484* (2022.01)
  *G06F 16/9535* (2019.01)
  *G06F 16/9538* (2019.01)

(52) U.S. Cl.
  CPC ......... *G06F 16/9538* (2019.01); *G06Q 50/20* (2013.01); *G06F 3/04817* (2013.01)

(56) References Cited

U.S. PATENT DOCUMENTS

| | | | |
|---|---|---|---|
| 8,375,452 B2 | 2/2013 | Raviv | |
| 9,262,767 B2 | 2/2016 | Sercinoglu et al. | |
| 9,703,871 B1 | 7/2017 | Das | |
| 9,953,185 B2 | 4/2018 | Bendersky et al. | |
| 10,810,256 B1* | 10/2020 | Goldberg | G06F 16/90335 |
| 2003/0120589 A1* | 6/2003 | Williams | G06Q 40/03 |
| | | | 705/7.42 |
| 2006/0026147 A1 | 2/2006 | Cone | |
| 2013/0110803 A1 | 5/2013 | Mikalsen | |
| 2013/0260356 A1* | 10/2013 | Kutty | G09B 7/00 |
| | | | 434/354 |
| 2014/0335497 A1 | 11/2014 | Gal | |
| 2015/0262077 A1 | 9/2015 | White et al. | |
| 2016/0266779 A1 | 9/2016 | Sheldon | |
| 2018/0246967 A1 | 8/2018 | Hill | |
| 2020/0234606 A1* | 7/2020 | Anders | G09B 7/00 |
| 2022/0108413 A1* | 4/2022 | Hack | G06Q 50/20 |
| 2024/0211520 A1 | 6/2024 | Tholfsen | |

OTHER PUBLICATIONS

Non-Final Office Action issued in U.S. Appl. No. 18/145,599, mailed on May 20, 2024, 24 Pages.

Understanding User Behavior with Google Analytics, Retrieved from: https://web_archive.org/web/20190417094257/ https:/support.google.comianalyticsianswer/7126596?h1=en, Apr. 17, 2019, 5 Pages.

Notice of Allowance mailed on Oct. 25, 2024, in U.S. Appl. No. 18/145,599 18 pages.

* cited by examiner

| Microsoft Teams | | Search | | ... |
|---|---|---|---|---|

Search Coach — Close

Summary 570

Student work
Not turned in View history 597
face masks essay.docx
Essay: Are face m... 598
Scarlet

Feedback
Enter feedback

Points ☐ /25

[Return]

1
Search: are face masks effective?
Saved page: How well do face masks protect against coronavirus? – Mayo ...
www.mayoclinic.org/diseases-conditions/coronavirus/in-depth/coronavirus-masks/art-20485559

| NewsGuard 100/100 | Domain Mayoclinic.org | Last crawled One day ago | Country United States |

Reason: I selected this source because it is from a medical website.
Citation: ✓ MLA (view)

2
Saved page: ace masks controversy site:edu
Wearing a Mask Can Be Controversial – The Nexus
www.psych.edu/science-and-technology/why-wearing-a-mask-can-be-controversial

| NewsGuard 80/100 | Domain jefferson.edu | Last crawled A week ago | Country United States |

Reason: I selected this source because it talks about the controversy of wearing masks.
Citation: ⚠ MLA (view)

3
Search: do face coverings reduce risk of covid?
Saved page: Coronavirus (COVID-19) frequently asked questions.

Search Summary

1001

| 4 | 7 | 15 | 3 |
|---|---|---|---|
| Searches | Saved sources | Sources opened | Search sessions |

Searches

| Search term | Filters used | Opened websites | Saved sources |
|---|---|---|---|
| What do astronauts eat | | 4 | 1 |
| astronaut daily diet | GOV | 5 | 1 |
| astronaut daily diet | PPT | 1 | 3 |
| space food | | 5 | 3 |

1003 what do astronauts eat

Eating in Space | NASA
*www.nasa.gov/audience/foreducators/stem-on...*

| NewsGuard 100/100 | Domain nasa.gov | Last crawled 2 days ago | Country United States |

Student work — Christie

Search Progress

Feeback
Great Job! I like how you tried different searches, and you used some filters.

Points ☐ / 100

Return

FIGURE 10

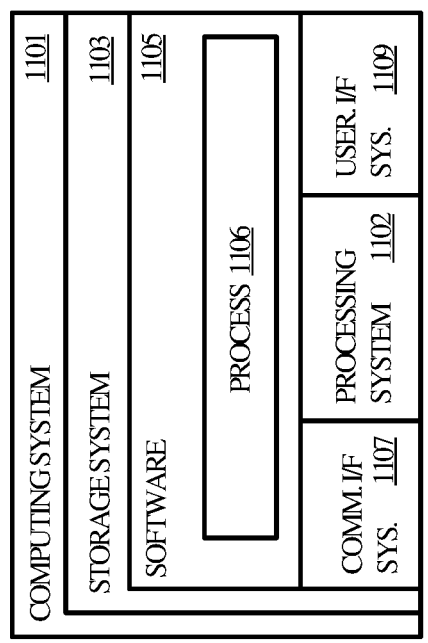

ONLINE LEARNING PLATFORMS WITH ENHANCED SEARCH ASSIGNMENTS

TECHNICAL FIELD

Aspects of the disclosure are related to the field of computer software applications and services and, in particular, to online learning platforms and associated tools.

BACKGROUND

Online learning platforms strive to simplify the creation, distribution, and grading of homework assignments. Such platforms allow files to be shared between teachers and students and enable students and teachers to communicate with ease. In a brief example, a teacher creates an assignment on a platform and posts the assignment to a class. The students in the class view the assignment on the platform, complete the assignment, and turn it in electronically via the platform. The teacher may then grade the completed assignments and provide feedback to the students, all without leaving the platform. Such environments vastly streamline classroom workflows to the benefit of students and teachers alike.

Many classroom assignments require students to conduct research on a particular topic and prepare a report on the same, including citations of the resource(s) used to conduct the research. Students often use search engines to research their topics, although how well they use the search engines is usually unknown to both them and their teacher. That is, while the speed and convenience provided by search engines are remarkable, many users struggle to use them effectively, including by submitting low-quality search queries, merely skimming the search results (or viewing only the first entry in the results), or the like. While providing citations with a report or assignment allows a teacher to consider the source of a student's research, the teacher remains largely uninformed as to how the student found a resource or why the student decided to rely upon it.

Poor search skills impact students in both near-term assignment completion and long-term skill development, since the quality of their research suffers. More generally, search queries that lack focus and direction result in ineffective results or worse—misleading results. In a frequent example, a user seeking information about a malady may input a search query that references the malady. However, depending upon the phrasing of the query, a given search engine is likely to return results that are weighted towards opinion articles, as opposed to factual articles that inform the user about the malady. In another example, a user may seek information on a controversial topic, in response to which a search engine presents results without any regard for the trustworthiness or validity of the results. Again, depending upon the phrasing of the query, a search engine may return results that are weighted toward addressing the topic in a particular manner.

In addition to the challenges discussed above, even searches for the most benign topics can produce results that are simply too scattered or unfocused to be of much use to a user. Indeed, it is common for users to repeatedly redo their searches in an effort to find better results, resulting in a waste of time on their part, and a waste of resources on a global scale with respect to the compute resources needed to perform the searches.

SUMMARY

Technology disclosed herein includes software applications and services that provide an enhanced user experience with respect to online learning platforms in general, and search instruction more particularly. In various implementations, search assignments (or any assignments having a search component to them) direct users to conduct research online while an enhanced user experience allows users to document their searches with ease. Such improvements allow users to be guided with respect to their searching skills, improving search skills in general and conserving time and resources more broadly.

In various implementations, a computing device executing software displays a view of a search assignment in a user interface of a learning platform. The device receives user input comprising search terms associated with the search assignment, and generates queries based on the user input. The device submits the queries to a search engine, whereupon the search engine performs searches based on the queries, and the device displays the results. As a user evaluates resources provided in the results, the device updates the user interface to include an option selectable for adding evaluated ones of the resources to a collection of resources for the search assignment. In response to the user selecting the option with respect to a resource of the evaluated ones of the resources, the device adds the resource to the collection of resources.

This Summary is provided to introduce a selection of concepts in a simplified form that are further described below in the Technical Disclosure. It may be understood that this Summary is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

FIGS. 5A-5D illustrate an instructor-centric user experience in an implementation.

FIGS. 6A-6J illustrate a student-centric user experience in an implementation.

Figure 7A:
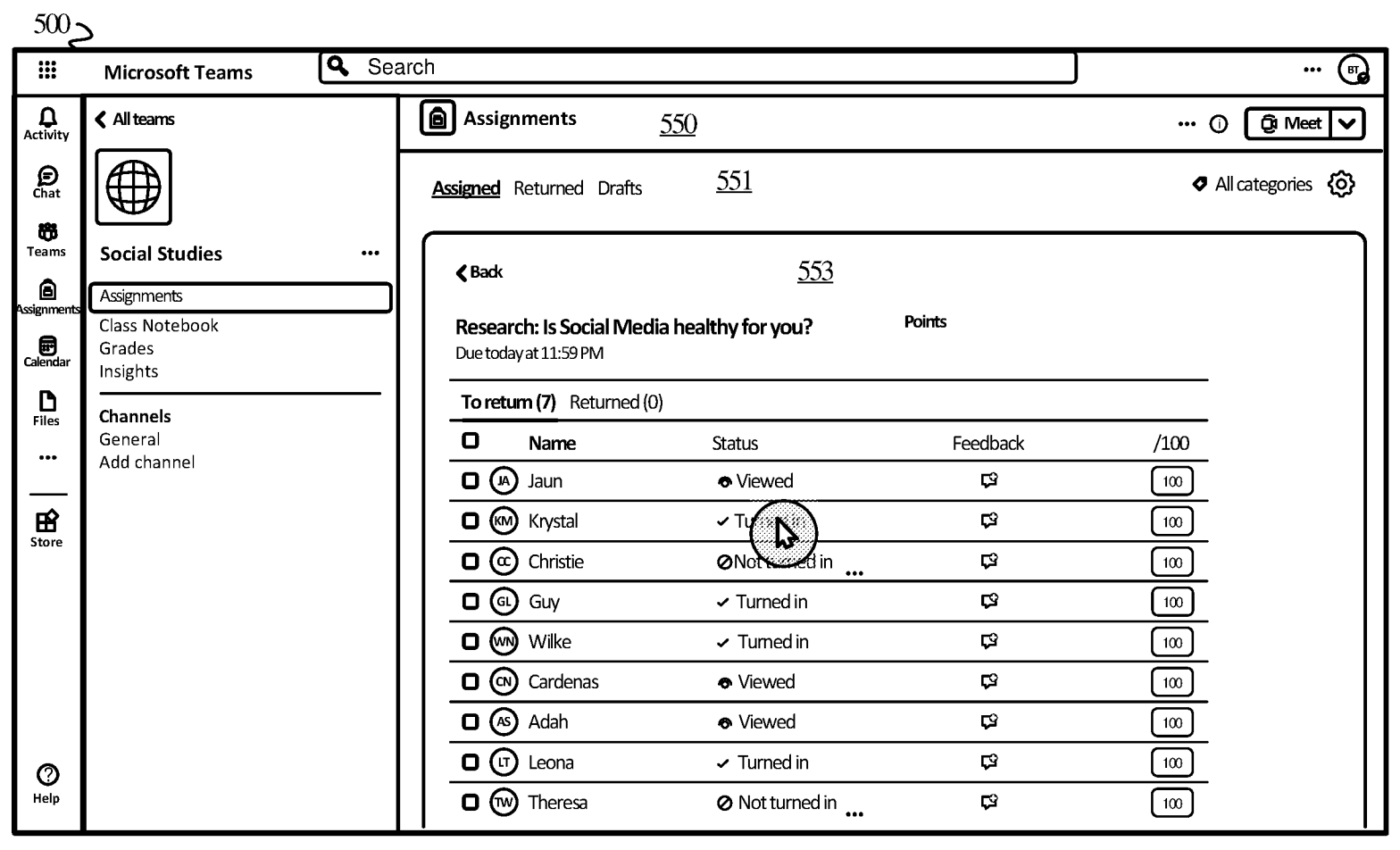
Figure 7B:
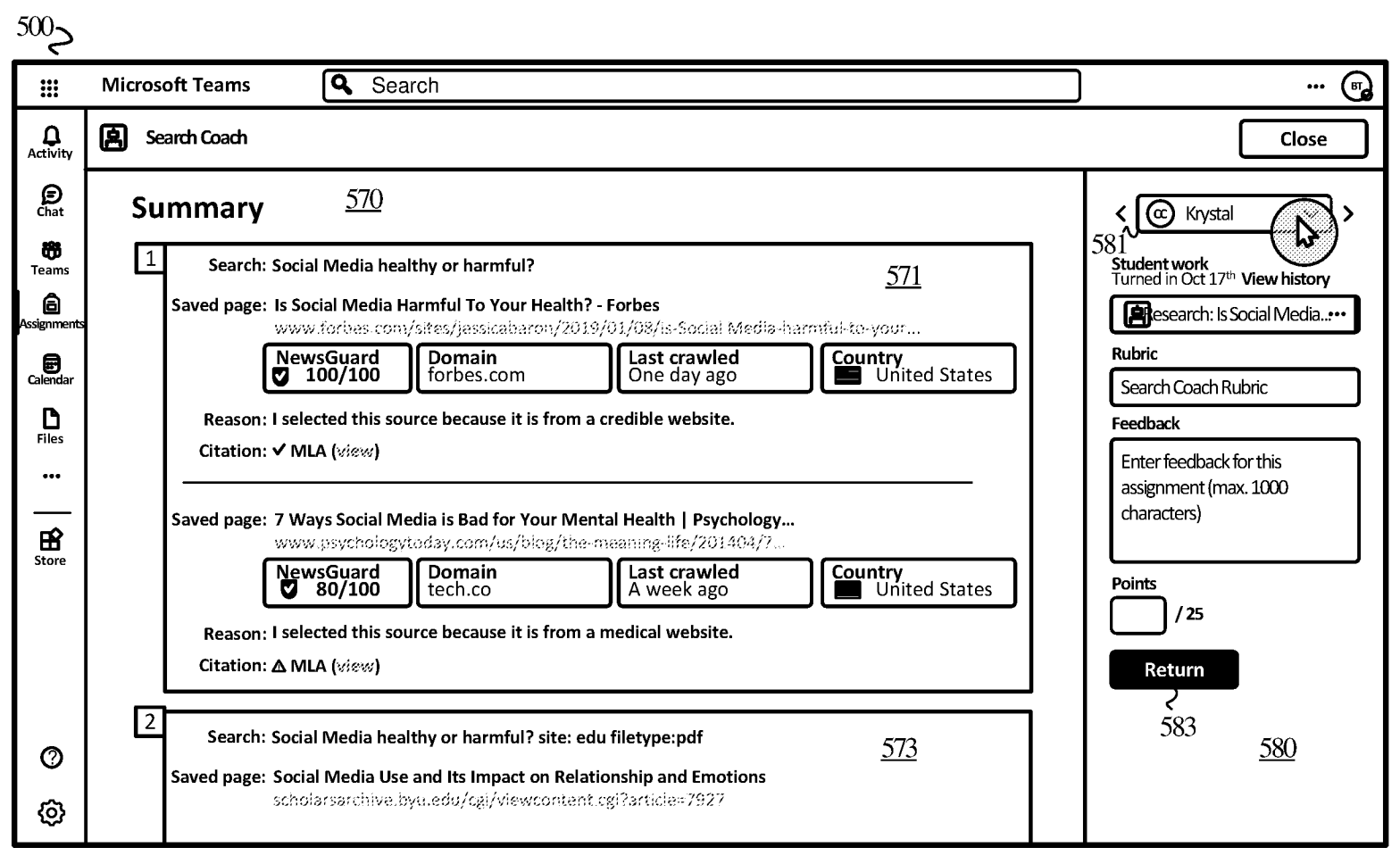

FIGS. 7A-7B illustrate an instructor-centric user experience in an implementation.

FIGS. 8A-8C illustrate an instructor-centric user experience in an implementation.

FIG. 9 illustrates a student-centric user interface in an implementation.

FIG. 10 illustrates an instructor-centric user interface in an implementation.

FIG. 11 illustrates a computing system suitable for implementing the various operational environments, architectures, processes, scenarios, and sequences discussed below with respect to the other Figures.

DETAILED DESCRIPTION

Figure 1:
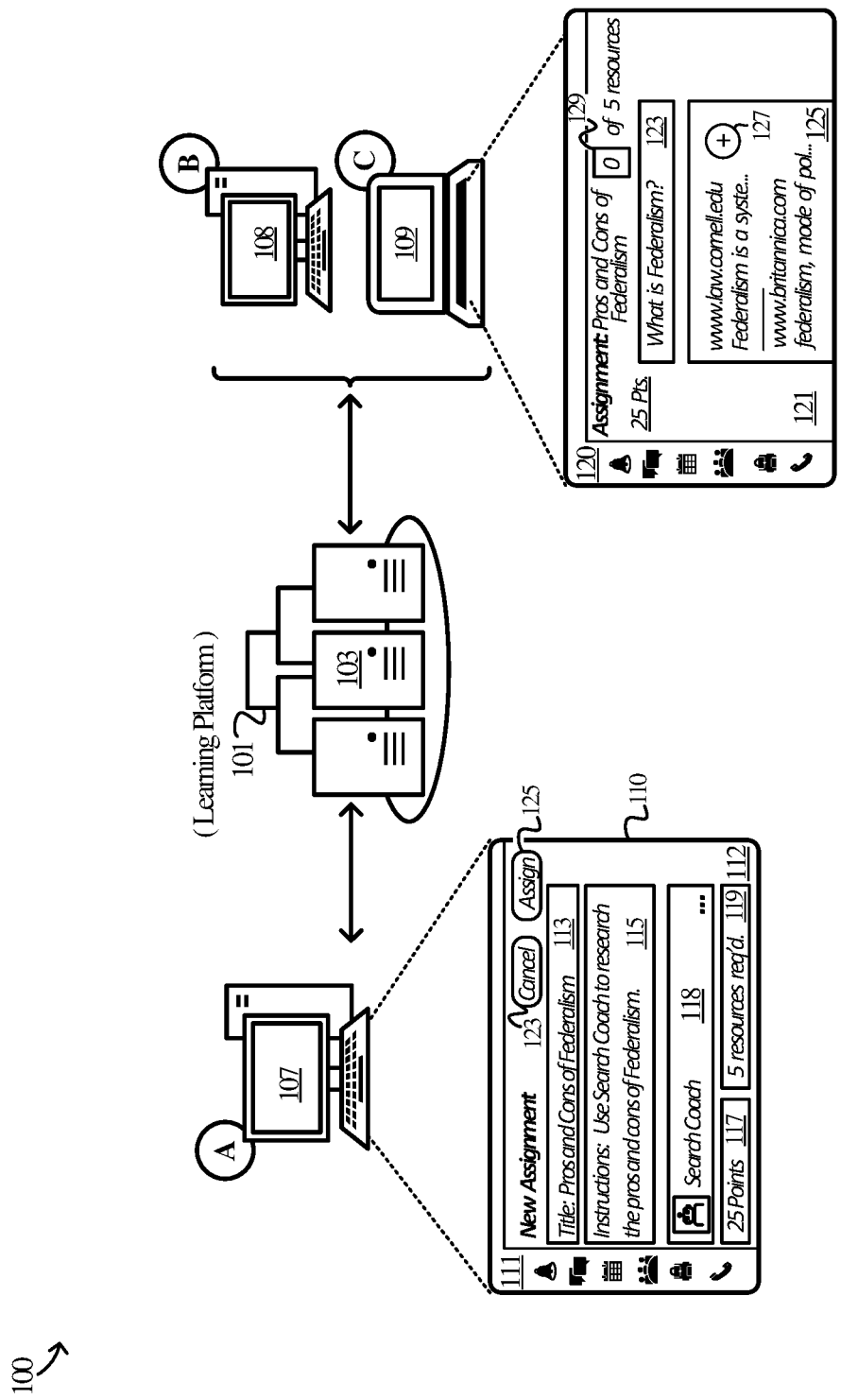
FIG. 1 illustrates an operational environment in an implementation.

Technology disclosed herein is generally directed to an enhanced user experience with respect to online learning platforms that allows users to improve their searching techniques in a defined environment. In various implementations, a teacher may configure a search coach assignment by adding a search coach tool to the assignment, setting a particular number of resources required for the assignment and, optionally, asking students to provide annotations regarding why each resource was selected.

The student receives the assignment and uses a specialized search engine assignment mode to complete the assignment. The assignment mode includes an indication of the assignment, how many resources are required, and a collection link to save resources. As the student conducts searches to answer the assignment question and evaluates the resources provided in the search results, the student may add resources to his collection (e.g., via a + or add button). The student may select the collection link to see the resources that the student has saved and to edit the reason for selection. Once the student is satisfied with the assignment, the student may turn the assignment in to the teacher.

In various implementations, a software application executed on a computing device communicates with an online learning platform hosted on one or more servers in a data center remote from the computing devices. The software is capable of providing a relevant user experience to teachers and students. In a teacher-centric experience, the software allows teachers to create, define, and post search assignments, as well as to review and grade turned-in assignments. In a student-centric experience, the software allows students to review, complete, and turn-in assignments.

While reference is made throughout to search assignments, it may be appreciated that the features and functionality described herein with respect to search assignments apply as well to any type of assignment having a search component. Similarly, while reference is made throughout to teacher and student roles, the features and functionality described herein apply as well to other types of roles where one user provides instruction for the benefit of another user. For example, the features and functionality described herein with respect to teacher-roles apply as well to managers instructing employees, team leaders guiding team members, and the like.

Various technical effects that result from the enhanced user experiences disclosed herein may be apparent. At a high level, the instruction provided to individual users form the basis for improved instruction with respect to searching skills and techniques. The improved instruction, when applied by students or others in such roles, results in improved search queries. In turn, the improved search queries reduce search churn by driving improved search results.

In the aggregate, a reduction in search churn reduces the compute resources required of the search engines that perform the searches. A reduction in search churn may reduce demand on a global scale for the energy required to power modern search engines. At a more local level, reduced search churn consumes less battery power (e.g., on mobile devices) since fewer searches are needed, to say nothing of improving the basic user experience with respect to search. Better searching also reduces the time it takes a user to find and access relevant information, time which may be spent on other productive activities.

FIG. 1 illustrates an operational environment 100 in an implementation. Operational environment 100 includes learning platform 101, computing device 107, and computing devices 108 and 109. Learning platform 101 employs one or more server computers 103 co-located or distributed across one or more data centers connected to computing devices 107, 108, and 109. Example servers include web servers, application servers, virtual or physical servers, or any combination or variation thereof, of which computing device 1101 in FIG. 11 is broadly representative.

Computing devices 107-109 communicate with learning platform 101 via one or more internets and intranets, the Internet, wired and wireless networks, local area networks (LANs), wide area networks (WANs), or any other type of network or combination thereof. Examples of computing devices 107-109 include personal computers, tablet computers, mobile phones, gaming consoles, wearable devices, Internet of Things (IoT) devices, and any other suitable devices, of which computing device 1101 in FIG. 11 is also broadly representative.

Generally speaking, learning platform 101 provides one or more services to end points such as computing devices 107-109. Example services include collaboration applications and services, productivity application services, a search coach service, a search engine service, and the like. The various features and functionality provided by the applications and services available through learning platform 101 are provided in the context of applications running locally with respect to end-users. For example, computing devices 107-109 execute applications that provide a local user experience and that interface with learning platform 101. Example applications include collaborative communication applications capable of organizing users into groups (e.g., students in a class). The applications running locally with respect to computing devices 107-109 may be natively installed and executed applications, applications that run in the context of a web-browser, mobile applications, or any other type of application capable of interfacing with learning platform 101 and providing a user experience.

Figure 2:
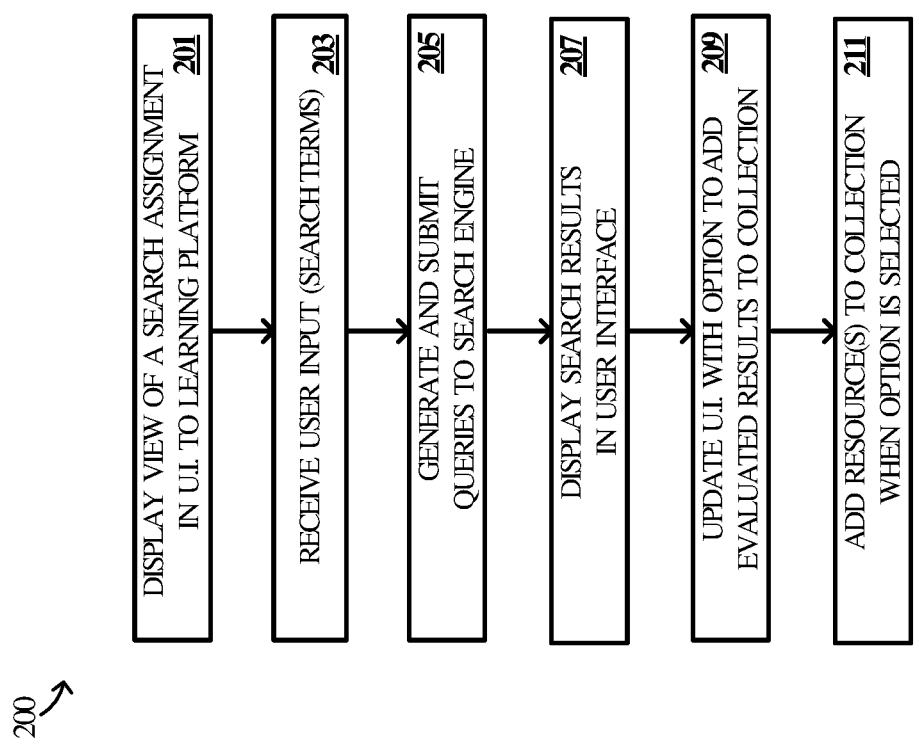
FIG. 2 illustrates a search assignment process in an implementation.

FIG. 2 illustrates a process 200 employed by computing devices 108 and 109 to provide the student-centric user experiences disclosed herein. Process 200, illustrated in detail in FIG. 2, is a method implemented in program instructions in the context of a software application running any suitable computing device (e.g., computing devices 108 and 109) capable communicating with learning platform 101. The program instructions direct the computing device (s) to operate as follows, referring to the steps illustrated in FIG. 2.

To begin, a computing device employing process 200 displays a view of a search assignment in a user interface (UI) to a learning platform (step 201). The device receives user input including search terms associated with the search assignment (step 203). The device generates queries based on the user input and submits the queries to a search engine (step 205). The search engine performs searches based on the queries and returns results to the device. The device displays the results in a user interface for a user to consider (step 207).

As the user reviews the results, the user may determine to select specific ones of the results in order to view the content behind a given result. For example, the search results may list numerous web pages. As the user considers the results, the user may determine to click-through to one of the web pages so as to evaluate the article, paper, or other such resource on the website associated with the search result. When the user returns to the search results, the computing device updates the user interface to include an option next to the resource that was evaluated that is selectable to add the resource to a resource collection for the search assignment (step 209). If the user selects the option, the device adds the resource to the collection (step 211). The resource collection may include citations for each resource in the collection, as well as a representation of the search query used to obtain the search results that included the resource.

A technical effect provided by process 200 includes the ability for a user to automatically include a citation for a resource, rather than having to manually create the citation. In addition, dynamically surfacing the option to add a resource to a collection only after the resource has been evaluated assists the user with tracking which resources have been evaluated. Providing the search query with the citations as part of an assignment also provides context for the student user to consider, as well as for an instructional user to consider. For instance, a teacher reviewing a student's citations for an assignment will be able to consider the search query that led to a particular resource relied upon and cited by the user.

Referring back to FIG. 1, the following is a brief discussion of an example application of process 200 by computing device 109 in the context of operational environment 100. In operation, user A operates computing device 107 in an instructional role with respect to users B and C. User B operates computing device 108, while user operates computing device 109. User A may be, for example, a teacher of a class, while users B and C are students in the class. An application running on computing device 107 provides user A with a user interface 110 to learning platform 101 from the perspective of an instructional role. In contrast, an application running on computing device 109 provides user C with a user interface 120 to learning platform 101 from the perspective of a student. A user in an instructional role navigates and interacts with user interface 110 to create and manage assignments, while a user in a student role interacts with user interface 120 to consider and complete assignments.

User interface 110 includes a feature menu 111 that includes various icons for navigating to different modalities of the application. The icons include, for example, an alarm icon for viewing reminders, a chat icon for messaging other users, a calendar icon for navigating to a calendar module, a teams icon for creating or navigating to different teams, a backpack icon for viewing homework assignments, and a phone icon for placing phone calls. A user may click-on or otherwise select any of the icons to navigate to their corresponding modules. Here, it is assumed for exemplary purposes that user A selected the backpack icon in order to navigate to an assignments view 112 in user interface 110.

Assignments view 112 is representative of one view in a series of view that may be provided by the application as an instructional user navigates user interface 110, more detailed examples of which are described below with respect to FIGS. 5A-5D and FIGS. 7A-7E. Assignments view 112 includes various features and functionality that allow the user to create, configure, and post search assignments. For example, assignments view 112 includes a title block 113 for inputting the name of an assignment, an instructions block 115 for inputting detailed instructions for completing the assignment, a points block 117 for inputting the number of points allocated to the assignment for grading purposes, and a resource block 119 for inputting the number of research resources required for the assignment.

Assignments view 112 also includes a search coach block 118 for adding a search coach feature to the assignment. Adding the search coach feature enables search coach functionality for the assignment. For instance, when a student user is working on the assignment features and functionality of a search coach service will be provided to assist or otherwise enhance the student's searching experience.

User interface 120, displayed in the context of a student-centric user experience, includes a search view 121 of the assignment created by user A in user interface 110. Search view 121 is representative of one view in a series of views that may be provided by the application as a student user navigates user interface 120, more detailed examples of which are described below with respect to FIGS. 6A-6J.

Search view 121 includes various features and functionality that a user encounters when working on a search assignment that has been assigned by a teacher view user interface 120. Search view 121 displays details of the assignment such as its title. Search view 121 also includes an input box 123, which is representative of a user interface to a search engine. A student user may type search terms in input box 123 which are used as the basis for queries submitted to the search engine. Results of searches returned by the search engine may be displayed in results space 125. Display frame 125 is representative of a window, box, or other such element of a user interface where a user can view and select search results.

Results space 125 includes an option 127 selectable for adding a resource reflected in the search results to a collection of resources for the assignment. Examples of option 127 include graphical button(s) that a user may touch, click-on, or otherwise select, causing the application to add a resource to the collection for the assignment. Graphic 129 in search view 121 is a user interface element capable of displaying a count of how many resources have been added to an assignment's collection of cited resources. However, it may be appreciated that option 127 is surfaced in association with a resource only upon the resource being evaluated by the user. That is, until a user has clicked through to a resource, option 127 is absent from results space 125 and the resource cannot be added to the resource collection. Only once the user has viewed the resource can it be added to the resource collection. Thus, in search view 121, is it assumed for exemplary purposes that user C has clicked through to the website hosting the first article in the search results (for which a selectable option 127 is displayed), but not the second article in the search results (for which a selectable option is not yet displayed).

Figure 3:
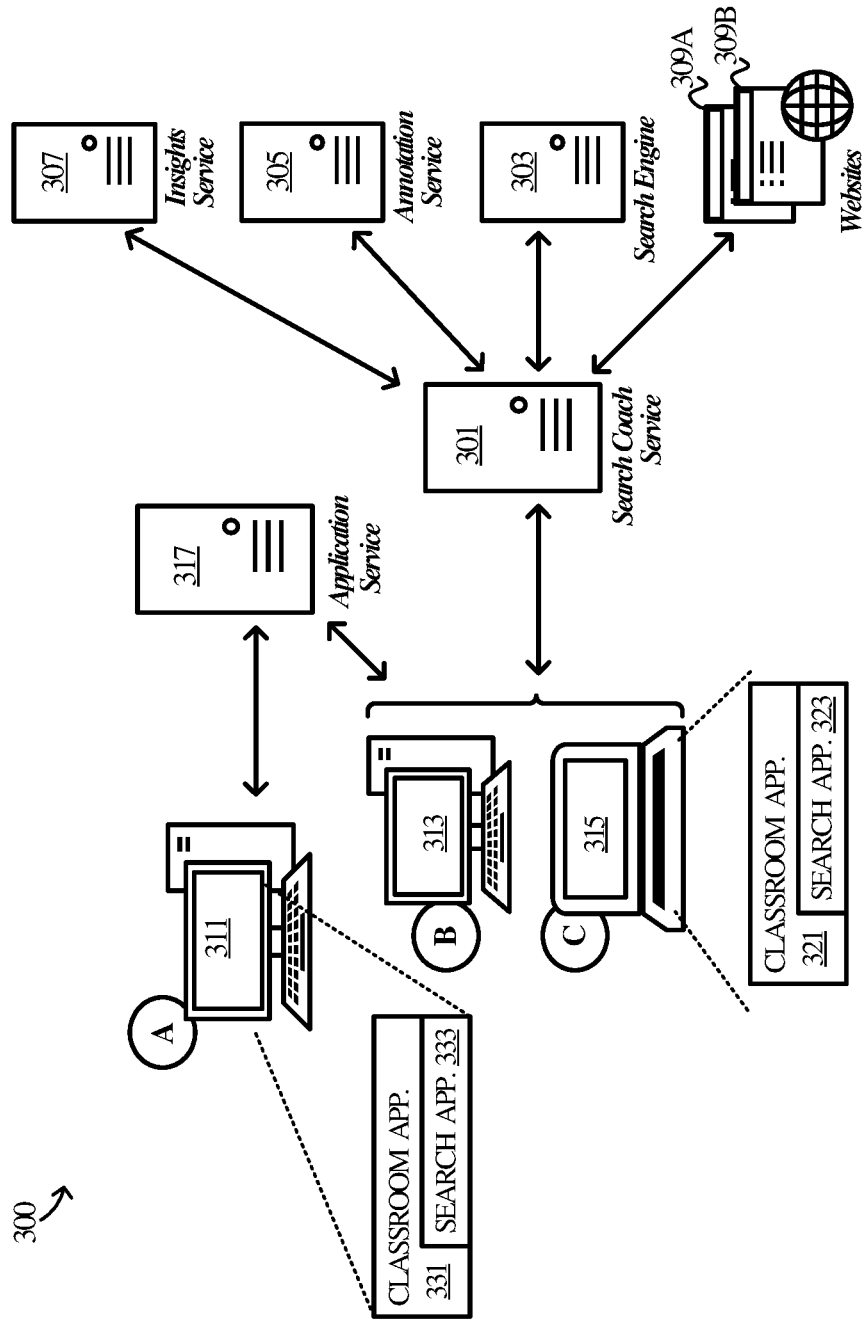
FIG. 3 illustrates an operational environment in an implementation.

FIG. 3 illustrates operational environment 300 in another implementation. Operational environment 300 includes search coach service 301, search engine 303, annotation service 305, insights service 307, and application service 317. Operational environment 300 also includes computing devices 311, 313, and 315, which interface with one or more of the aforementioned components of operational environment 300.

Search coach service 301, search engine 303, annotation service 305, and insights service 307 are each representative of software services, micro-services, or the like, implemented on one or more server computers co-located or distributed across one or more data centers connected to computing devices 311-315. Application service 317 is also representative of a software service, micro-service, or other such application implemented on one or more server computers co-located or distributed across one or more data centers connected to computing devices 311-315. Example servers include web servers, application servers, virtual or physical servers, or any combination or variation thereof, of which computing device 1101 in FIG. 11 is broadly representative.

Computing devices 313-315 communicate with one or more of search coach service 301, search engine 303, annotation service 305, insights service 307, and application service 317 via one or more internets and intranets, the Internet, wired and wireless networks, LANs, WANs, or any other type of network or combination thereof. Computing device 311 also communicates with application service 317 via one or more networks. Although not shown, computing device 311 may also communicate with one or more of search coach service 301, search engine 303, annotation service 305, and insights service 307. Examples of computing devices 311-315 include personal computers, tablet computers, mobile phones, gaming consoles, wearable devices, IoT devices, and any other suitable devices, of which computing device 1101 in FIG. 11 is also broadly representative.

Search coach service 301 provides an interface through which search tools on computing devices 313 and 315 access search engine 303 to perform Internet searches. Search engine 303 is representative of a search engine capable of indexing and searching web pages and other Internet resources 309A and 309B based on search queries generated by end points such as computing devices 313 and 315. Annotation service 305 is representative of a service capable of annotating search results at the request of search coach service 301 to provide context with respect to the search results. For example, annotation service 305 may identify specific results as more or less reliable sources of the information being sought by a specific query.

Insights service 307 is representative of a service capable of observing the usage of search engine features (e.g., filter operators) by users, analyzing the usage and delivering relevant insights about their usage. Insights service 307 communicates with search coach service 301 either in-line or out-of-band with respect to search queries flowing through the service to obtain indications of the filter operators being used. Insights service 307 develops a record of usage on a per-user basis that it may then leverage when developing insights to be considered by a user in an instructional role (e.g., a teacher) or by the user performing the searches (e.g., a student).

Application service 317 is representative of any application provided as a service that users may interact with via corresponding applications on their computing devices. Examples of application service 317 include—but are not limited to—collaboration services, communication services, productivity services, gaming services, and business application services. The local applications corresponding to application service 317 (e.g., a collaboration application, productivity application, or the like) are capable of hosting search-related applications in their execution contexts. Here, classroom application 321 on computing device 315 is representative of one such application which hosts a search application 323 and provides a student-centric user experience. A student user may engage with classroom application 321 to access its features and functionality, for example those related to an online classroom experience in the context of a learning platform. The student may also engage with search application 323—in the context of classroom application 321—to access its features and functionality (i.e., those of search application 323). For example, a student user may access an online classroom environment via classroom application 321 through which the user receives homework assignments, completes the assignments, and turns in the assignments. The student may also use search application 323 when completing the assignments.

Classroom application 331 is representative of an instance of the same or a different application capable of integrating a search application, represented here by search application 333. In other words, classroom application 331 may be the same application as application 321, a different version of the same application, or a different application entirely. A teacher user may engage with classroom application 331 in a teacher-centric mode to access its features and functionality, for example, those related to an online classroom experience in the context of a learning platform. Optionally, the teacher may also engage with search application 333—in the context of classroom application 331—to access its features and functionality (i.e., those of search application 333). For example, a teacher may access an online classroom environment via classroom application 331 through which the teacher creates and assignments homework assignments, grades turned-in assignments, and optionally communicates with students. The teacher may utilize search application 333 to obtain insights about the students and their searching proficiency to conduct searches of one's own, and the like.

Figure 4:
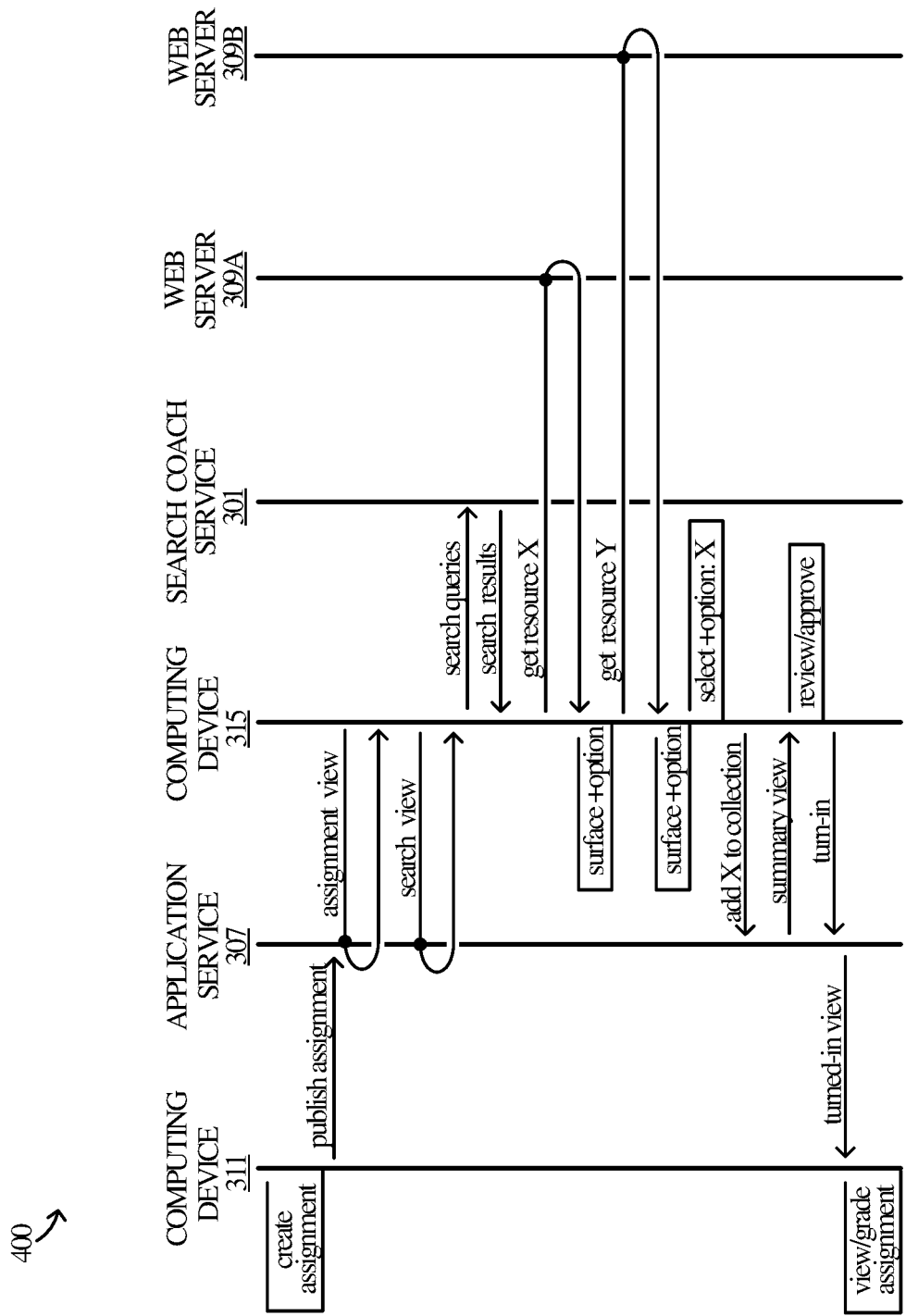
FIG. 4 illustrates an operational scenario in an implementation.

FIG. 4 illustrates a brief operational scenario 400 depicting an exemplary exchange between users A, B, and C in FIG. 3. It is assumed for exemplary purposes that user A is a teacher, while users B and C are students. The operations are illustrated with respect to computing device 311 associated with the teacher (user A) and computing device 315 associated with a student (user C). It may be appreciated that the features and functionality described with respect to computing device 315 would apply as well to computing device 313.

In operation, user A engages with computing device 311 via classroom application 331 to create and assign a search assignment to a group of users that include users B and C. Computing device 311, under the control of classroom application 331, posts the assignment to application service 317. The student users, engaged with application service 317 via their respective client applications 321, are able to view, complete, and turn in the assignment.

In particular, computing device 315, under the control of classroom application 321, retrieves a view of the assignment and displays the assignment view on a screen for user C to consider. The assignment view includes details of the assignment such as its title, instructions for completing the assignment (including a topic to search), the deadline for the assignment, and the points allocation for the assignment.

The assignment view also includes a control element for navigating to a search view for the assignment. Upon selecting the search view, computing device 315 requests the search view (or content for populating the search view) from application service 317. The search view is implemented by search application 323 in the context of classroom application 321. User C interacts with the search view by, for example, inputting search terms related to the assigned topic. Search application 323 submits search queries to search coach service 301 based on the search terms. Search coach service 301 obtains search results and returns them to search application 323 for display in a user interface. Search coach service 301, for example, submits the queries to search engine 303. Optionally, search coach service 301 may enlist the services of annotation service 305 and insights service 307 when formulating and delivering the results.

Computing device 315 surfaces the search results in a user interface for user C to consider. As the user evaluates the results by clicking through to or otherwise accessing them, search application 323 causes computing device 315 to surface an add option in the user interface allowing evaluated resources to be added to a resource collection for the assignment. For example, the user evaluates resource X, causing the add option to be surfaced in association with resource X in the user interface. The user then clicks through to resource Y, causing the add option to be surface in association with resource Y in the user interface. Having considered both resources, the user elects to add resource X to the resource collection by selecting the add option associated with resource X. Accordingly, search application 323 via computing device 315 adds the resource to the collection associated with the assignment.

User C ultimately completes the search assignment and is able to review a summary view of the resource collection. Satisfied with the collection, the user determines to turn-in the assignment, which computing device 315 communicates to application service 317. The teacher, user A, is then able to view and grade the turned-in assignment for user C.

Figure 9:
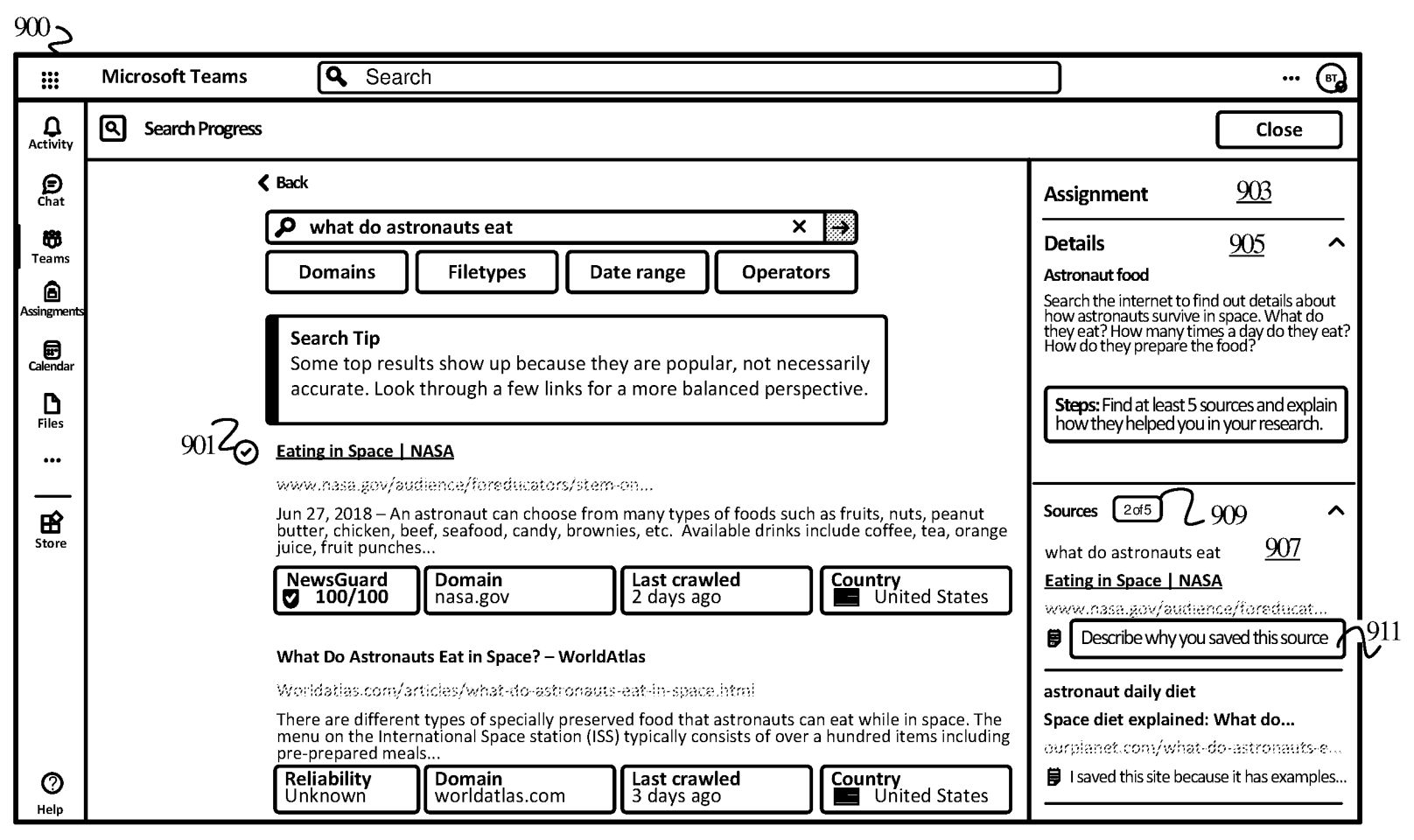

FIGS. 5A-5D illustrate an instructor-centric user experience in an implementation that is representative of the user A's experience described with respect to FIGS. 3-4 above. Related to FIGS. 5A-5D are FIGS. 6A-6J, which illustrate a student-centric user experience representative of user B's experience described above with respect to FIGS. 3-4. FIGS. 7A-7B illustrate another instructor-centric user experience that is further representative of user A's experience. Lastly, FIG. 9 and FIG. 10 illustrate a student-centric user interface and a teacher-centric user interface respectively.

Figure 5A:
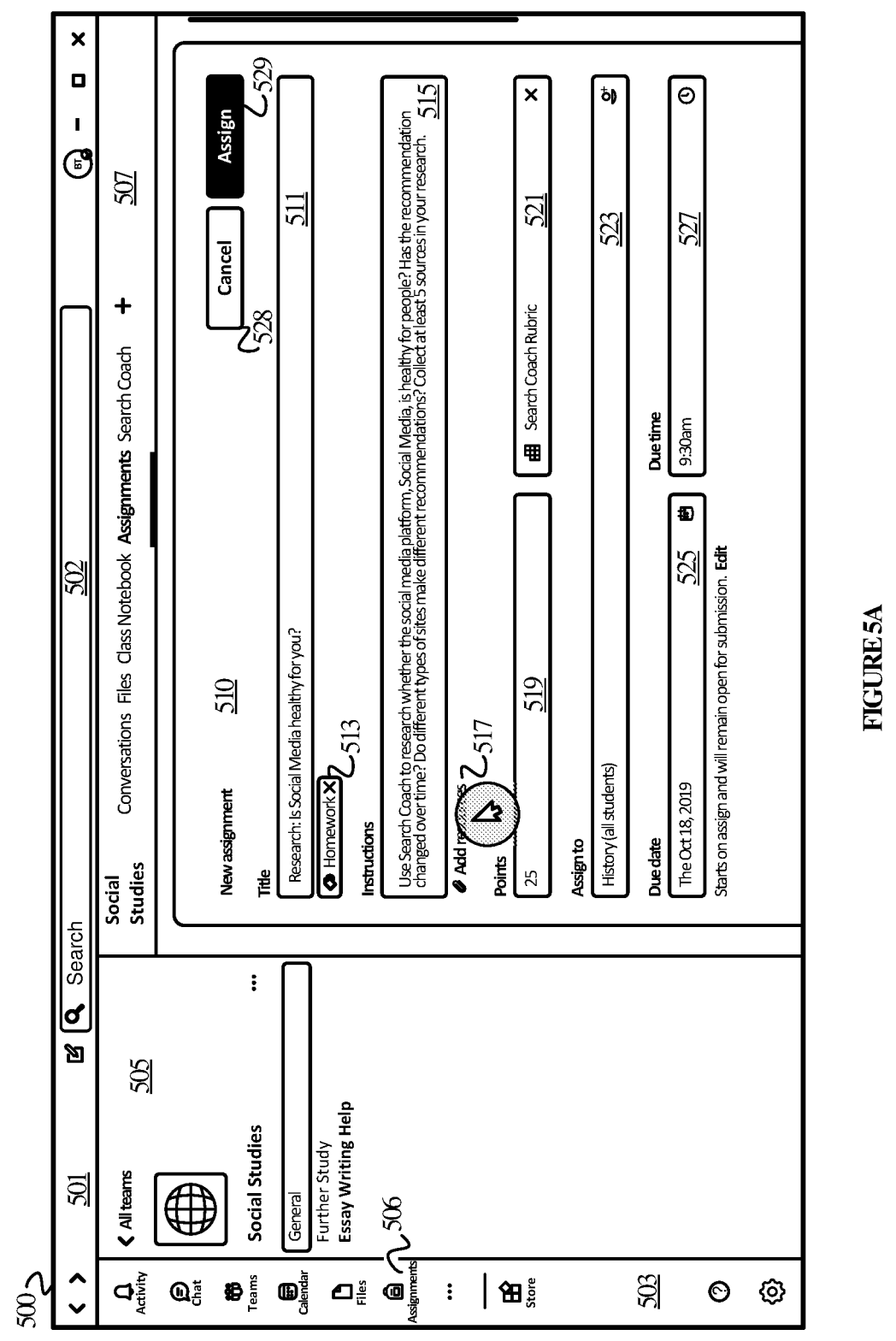
Figure 5B:
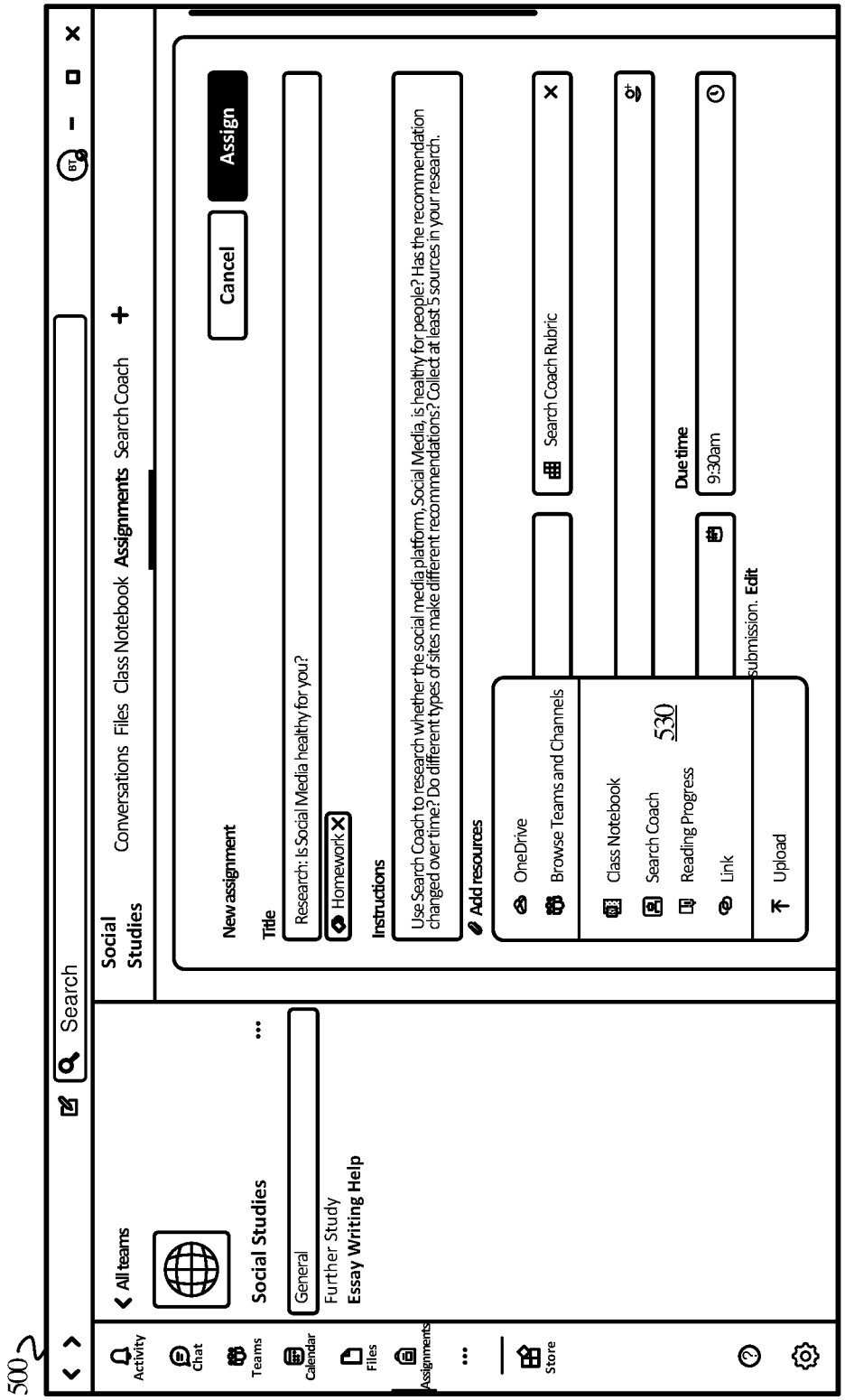

In particular, FIGS. 5A-5D illustrate the experience of a teacher when creating and assigning a search assignment in a user interface of an online learning platform. FIG. 5A illustrates user interface 500, which is representative of a user interface rendered by a collaboration application.

User interface 500 includes an application frame 501 across the top of the user interface that includes various features such as search box 502 for searching for contacts, files, chats, and the like in the collaboration application. Application frame 501 also includes controls for minimizing, maximizing, or closing the application. Along the left side of user interface 500, a feature bar 503 includes icons for launching various modules of the application. For example, feature bar 503 includes icons for alerts, messaging, team management, a calendar module, files, an assignments module, and an app store module. Each of the modules may be native to the collaboration application or separate add-in applications with respect to the collaboration application. In this example, the user has navigated to an assignments module for Social Studies via icon 506. Selecting application icon 506 causes the assignments module to launch in the context of user interface 500, while maintaining the features and functionality of the collaboration application.

For example, panel 505 is a base panel for the Social Studies team that the collaboration application displays in user interface 500. The Social Studies team is representative of teams that may be created and managed with the collaboration application. As such, panel 505 provides the user with basic information about the team and various features available through the team, whereas feature panel 507 in the upper right portion of user interface 500 provides specific features of the assignments module. For example, panel 507 includes a conversations feature, a files feature, a class notebook feature, an assignments feature, and a search coach feature. It is assumed for exemplary purposes that the assignments feature has been selected, which results in the display of assignments creation view 510 in user interface 500.

Assignments creation view 510 is representative of a view produced in the user interface by the assignments module that allows teachers to create new assignments.

Assignments creation view 510 includes a title box 511 for naming a new assignment, a type box 513 for specifying the type of assignment (in this case, homework), and an instructions box 515 for inputting directions for completing the assignment.

Assignments creation view 510 also includes a resources element 517 selectable to make other tools available in the context of the assignment, a points box 519 for inputting the number of points allocated to the assignment, and rubric box 521 for specifying a rubric for the assignment such as criteria for assessing the assignment and gradients for evaluating the criteria. Assignments creation view 510 further includes a distribution box 523 for specifying to whom the assignment should be assigned, a deadline box 525 for specifying a due date, and time box 527 for the time of day the assignment is due. Finally, assignments creation view 510 includes a cancel button 528 for backing out of the assignment creation view, as well as an assign button 529 for posting the assignment to the class.

Here, it is assumed for exemplary purposes that the teacher elects to select resources element 517 in order to add a tool to the assignment. As illustrated in FIG. 5B, the application responds to the user input by surfacing menu 530 in user interface 500. Menu 530 includes a list of available tools to link or otherwise attach to the search assignment including a notebook tool, a search coach tool, and a reading progress tool. It is further assumed for exemplary purposes that the user selects the search coach tool.

Figure 5C:
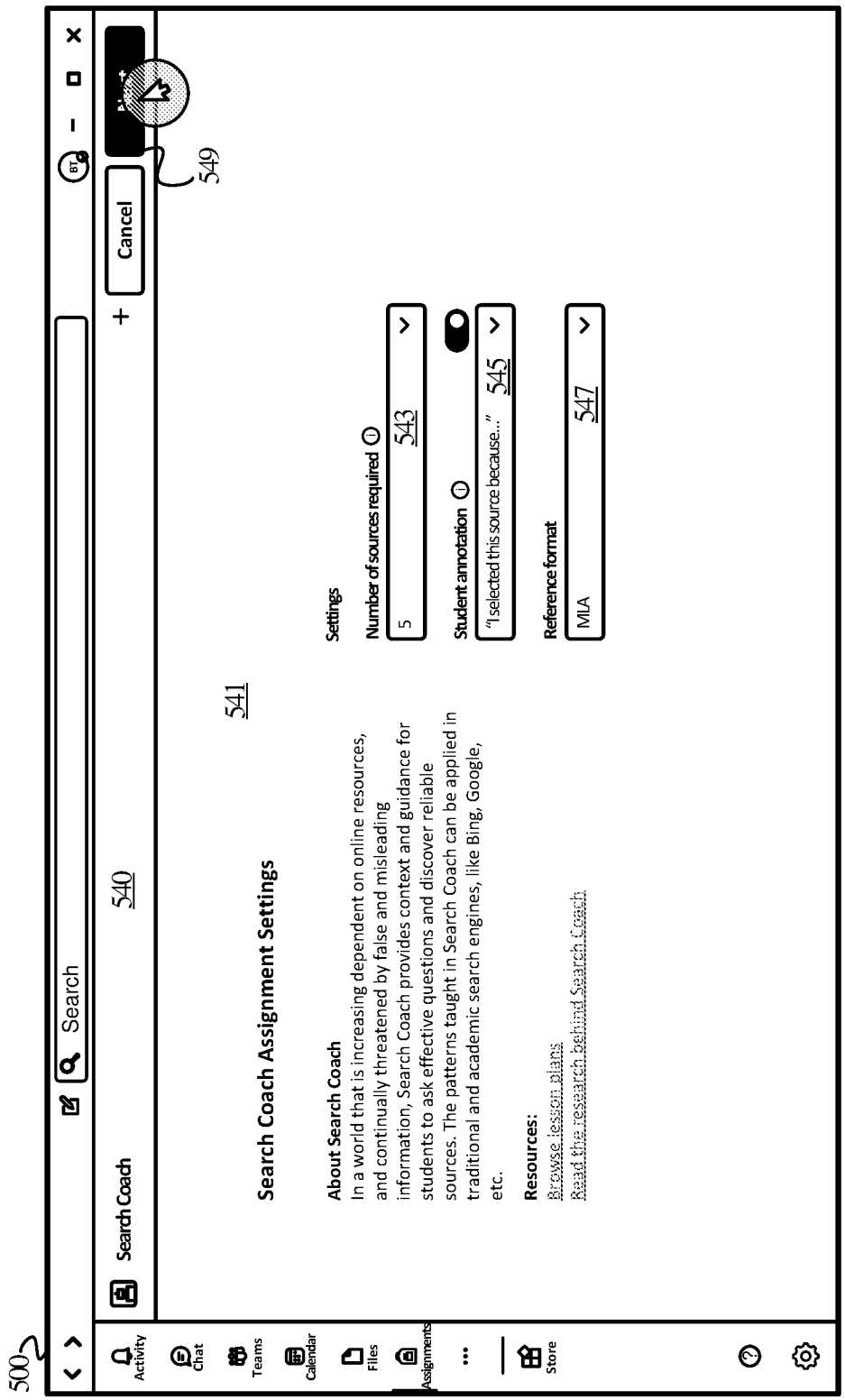

Referring to FIG. 5C, the application responds to the user's selection of the search coach tool in menu 530 by surfacing a search coach view 540 in user interface 500. Search coach view 540 includes a settings page 541 that allows the user to configure the search coach tool for the search assignment. For example, settings page 541 includes a sources box 543 for specifying a number of resources required to be submitted for an assignment, an annotation box 545 for specifying a type of annotation required of a student (if any) when citing a resource, and a format box 547 for specifying the format of the required citations. The choices made in settings page 541 adhere to the new search assignment being created when the user selects the next button 549 to transition to a next stage in the creation process.

Figure 5D:
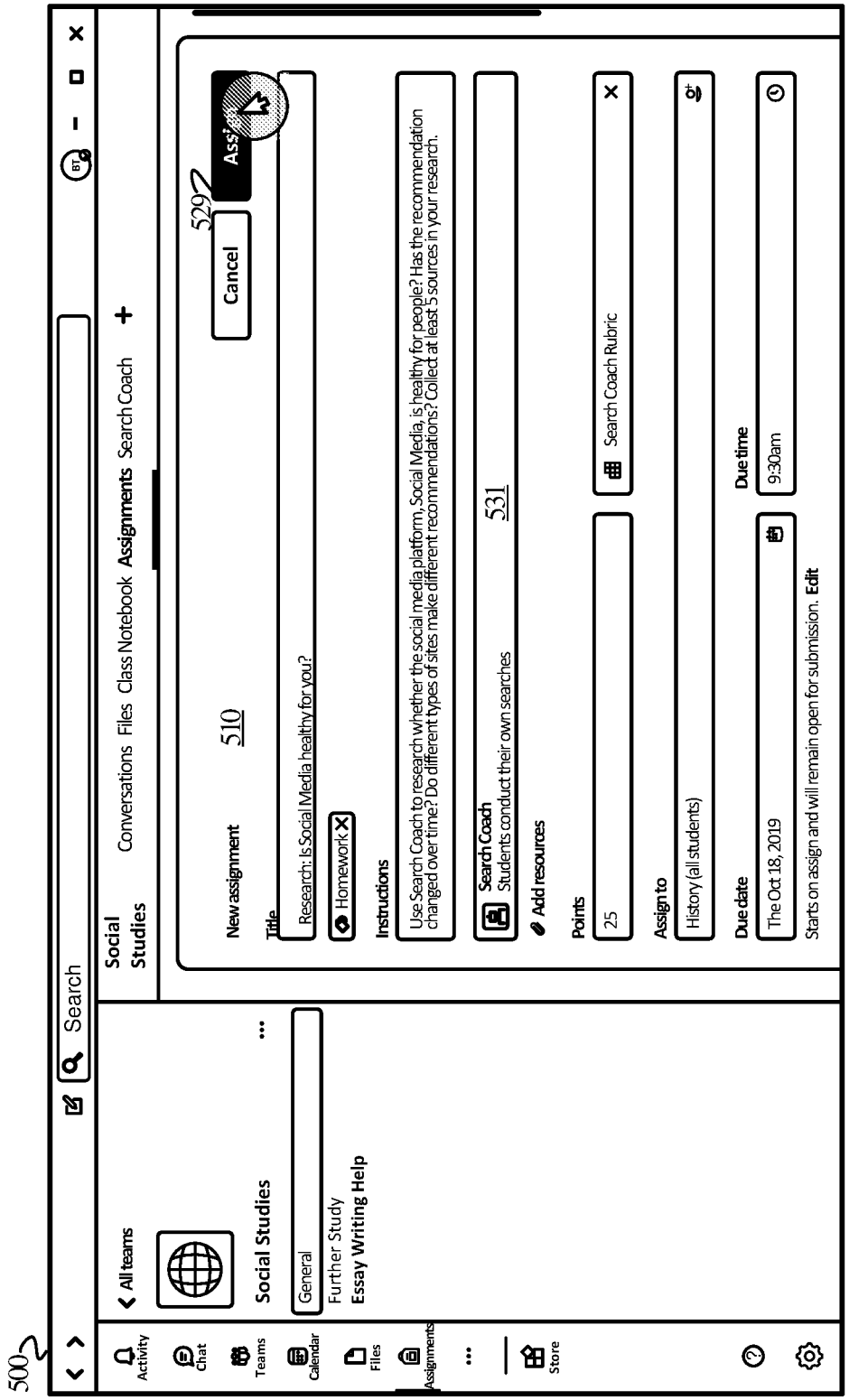

In FIG. 5D, user interface 500 has returned to assignments creation view 510. A search coach control 531 has been added to the view in response to the user adding the search coach tool to the assignment. In a next step, the user concludes that the assignment is ready to be posted and selects assign button 529. In the illustrated example, selecting the assign button 529 causes the new search assignment to be posted to an assignments page of the Social Studies page for the students to view and complete.

Figure 6A:
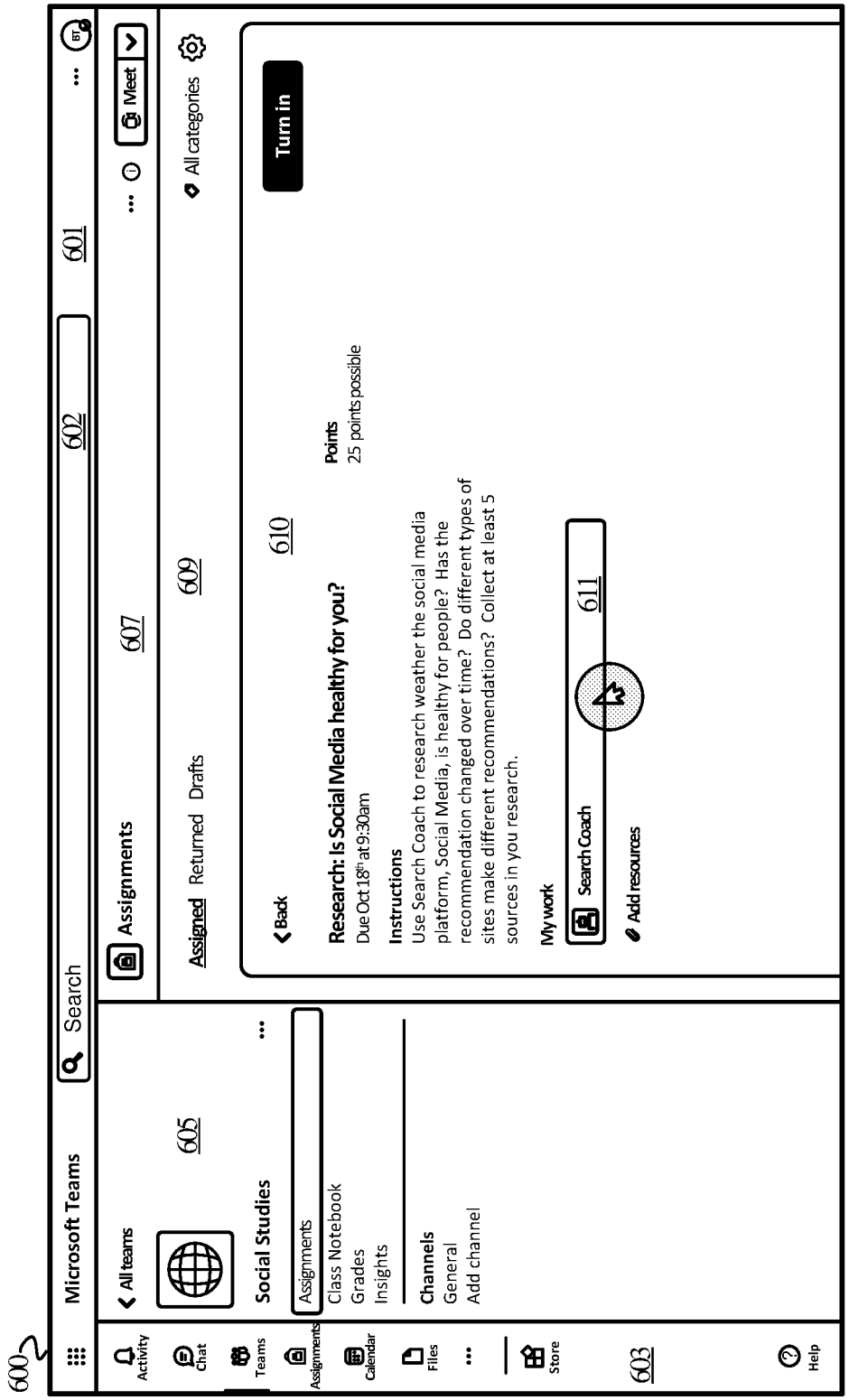

FIGS. 6A-6J illustrate the student user experience when working on the newly assigned search assignment. FIG. 6A illustrates user interface 600, which includes an application frame 601 across the top of the user interface that includes various features such as search box 602 for searching for contacts, files, chats, and the like in the collaboration application. Application frame 601 also includes controls for minimizing, maximizing, or closing the application. Along the left side of user interface 600, a feature bar 603 includes icons for launching various modules of the application. For example, feature bar 603 includes icons for alerts, messaging, team management and/or participation, a calendar module, files, an assignments module, and an app store module. In this example, the user has already navigated to a teams module for Social Studies.

Panel 605 in user interface 600 is a base page of the teams module for Social Studies in the student-centric view of the team. Panel 605 provides the user with basic information about the team and various features available through the team such as the ability to view assignments, a class notebook, grades, and insights. Here, it is assumed for exemplary purposes that the student user has navigated to an assignments view 607 of the team.

Assignments view 607 is provided in the context of a classroom mode of the application. In the assignment mode, user interface 600 includes a menu 609 of assignment types including those that have been assigned, returned, and drafts. Selecting the assigned tab takes the user to a list of assigned assignments, whereas selecting the returned tab or drafts tab would take the user to a list of assignments returned by the teacher or assignments in draft stage by the student, respectively. Here, the user has selected the assigned tab, which in this case takes the user directly to a view of an assigned assignment, represented by search assignment view 610.

Search assignment view 610 provides a view of an assignment specific to a search lesson and is representative of the assignment created by the teacher in FIGS. 5A-5D. Search assignment view 610 includes details about the assignment such as its title, instructions for completing the assignment, and the points allocated to the assignment. Search assignment view 610 also includes a control 611 corresponding to the search coach tool linked to the assignment by the teacher. The student user may select control 611, which transitions user interface 600 to a search assignment mode detailed in FIG. 6B.

Figure 6B:
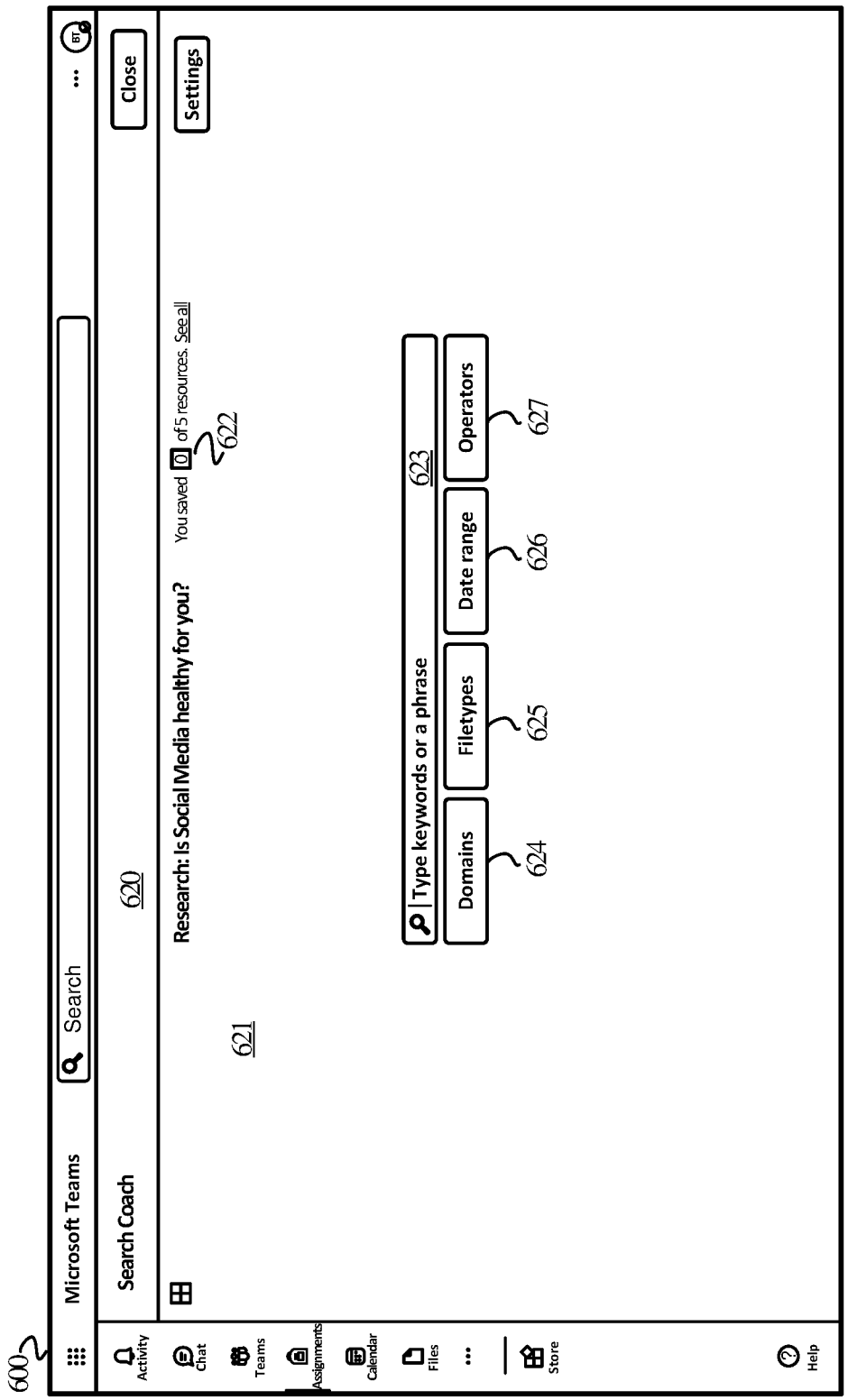

In response to the student user selecting control 611 in FIG. 6A, user interface 600 transitions to the search assignment mode which includes search coach view 620 in FIG. 6B. Search coach view 620 includes a search coach page 621 in which details of the assignment are displayed such as the topic or question to be researched. Search coach page 621 includes a resource count component 622 that displays the number of resources the student user has added to the assignment. Resource count component 622 is automatically incremented as the user adds evaluated resources to the user's collection.

Search coach page 621 also includes various components of the search coach tool available for the student user to use when completing the assignment. The components include search component 623 which provides a user interface to the search engine through which the user supplies the user input, such as search terms. The components also include filter controls 624-627 that the user may leverage to refine search queries. Example controls include a Boolean control, a domain control, a filetype control, and a timeframe control. The Boolean control 627 is used to add Boolean operators to the search query; the domain control 624 is used to restrict search results to select Internet domains; the filetype control 625 is used to restrict search results to specific file types; and the timeframe control 626 is used to filter results based on time and date. Other filter controls are also possible such as a regional control used to restrict search results to specific geographic or jurisdictional boundaries.

Figure 6C:
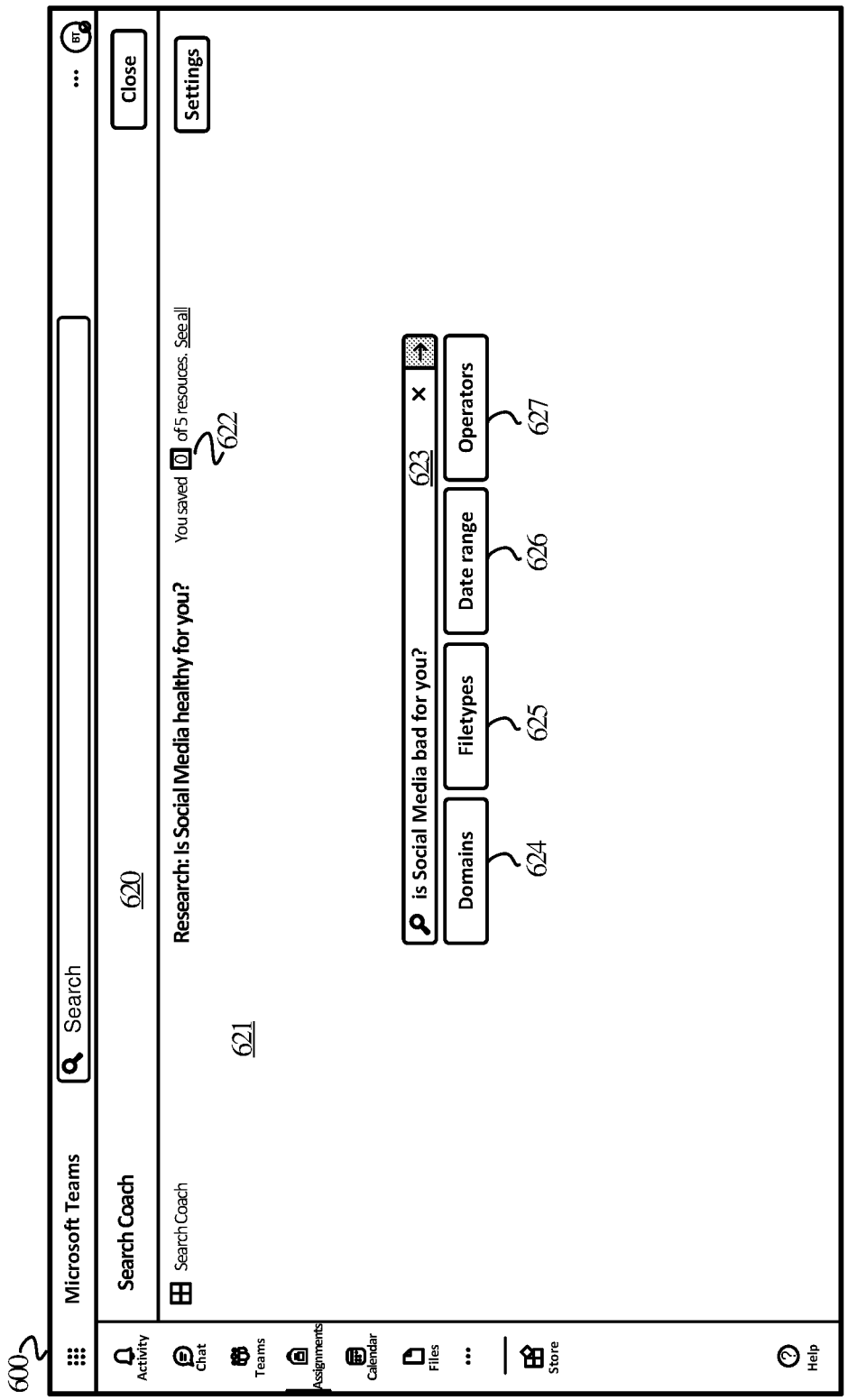
Figure 6D:
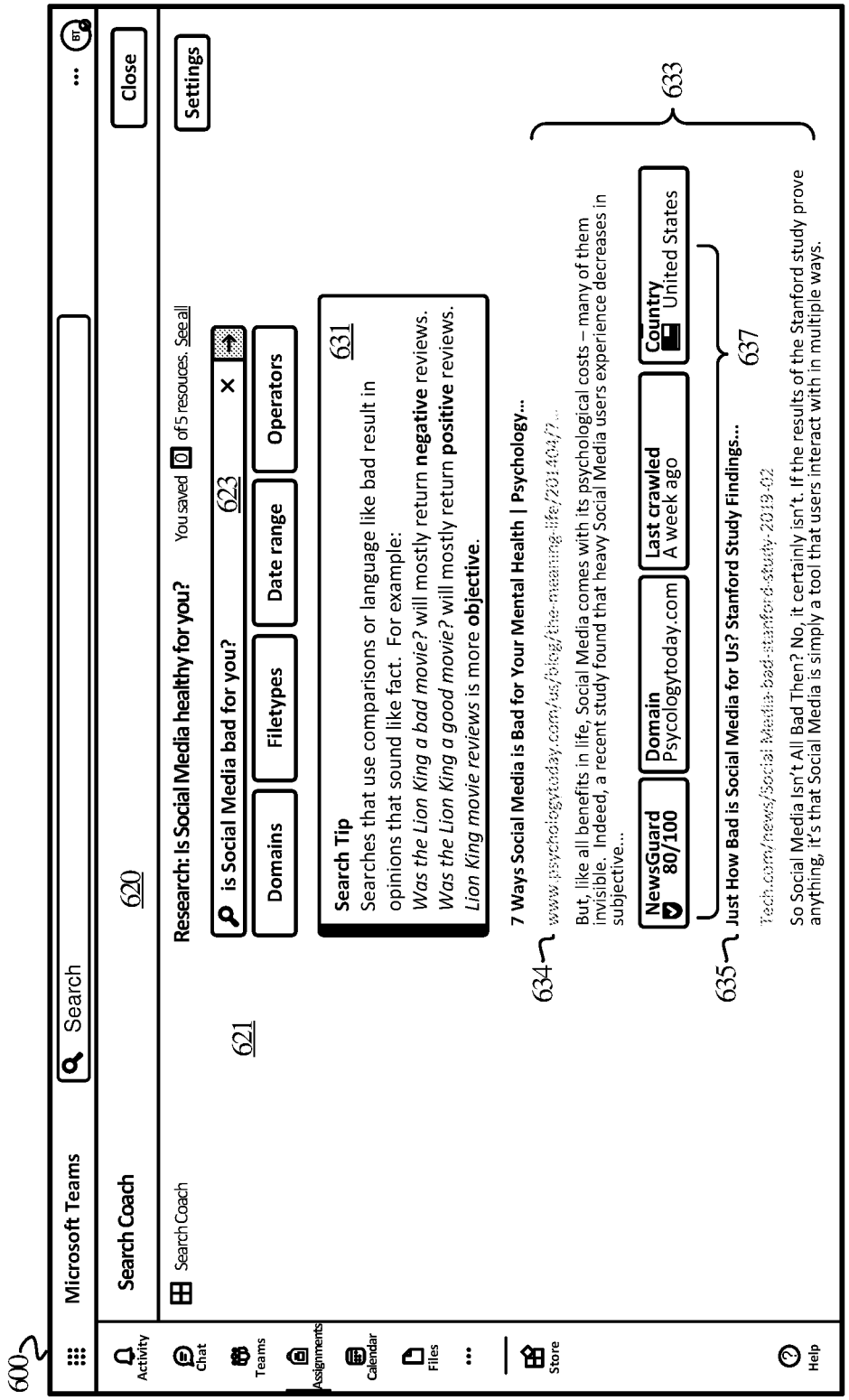

In FIG. 6C, the student user enters search terms into search component 623. Here, the search string reads: "Is Social Media bad for you?" The user commits the search query via search component 623 which causes the application to send a search query to the search engine. The search engine returns results of a search which are displayed in FIG. 6D. In FIG. 6D, search coach page 621 is updated with search results 633. Search results 633 include at least two results represented by result 634 and result 635. Both results include links for navigating to the resources corresponding to the results. For example, result 634 includes a link for navigating to an article on pyschologytoday.com, while result 635 includes a link for navigating to an article on tech.com.

In addition to the search results, search coach page 621 also includes a search tip component 631 that provides tips for improving the search, as well as context elements 637 for result 634. Search tip component 631 includes suggestions for altering the query to improve the results. The student user may consider the content displayed in search tip component 631 which provides suggestions for making the search query more objective. Context elements 637 provide contextual information to the student user about result 634 including a score related to the result's newsworthiness, its domain, when the domain was last crawled by the search engine, and the country of origin for the domain. The student user may consider context elements 637 when considering whether to select the link and navigate through to the resource.

Figure 6E:
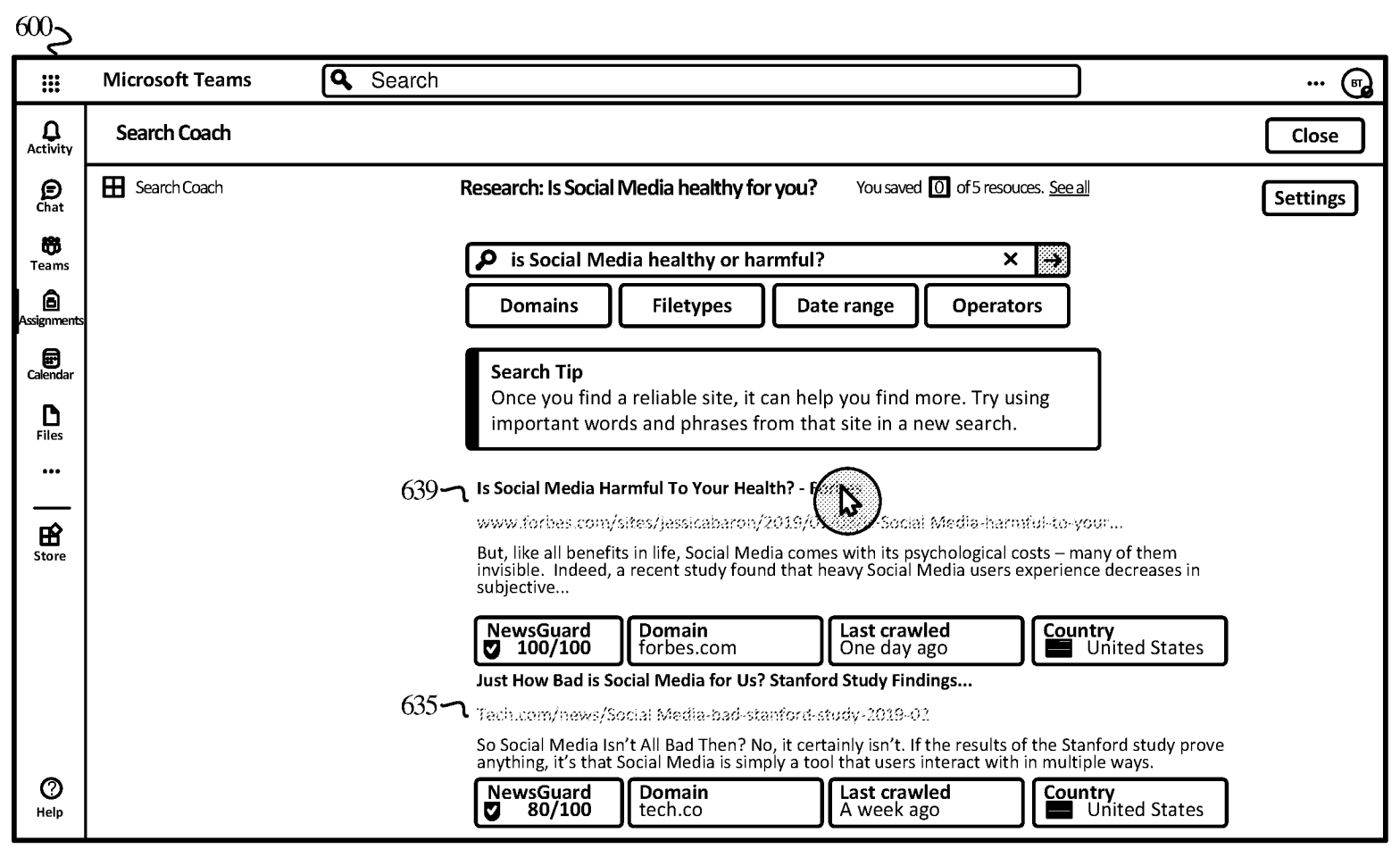

In FIG. 6E, the student user has reformulated the search query to state: "Is Social Media Healthy or harmful?" The new query returns slightly different search results represented by result 635 and result 639. Both results are provided with annotations. It is assumed here for exemplary purposes that the student user has decided to navigate to the resource represented by result 639. Accordingly, the user selects the link for result 639 which transitions the user experience to the scenario described in FIG. 6F.

Figure 6F:
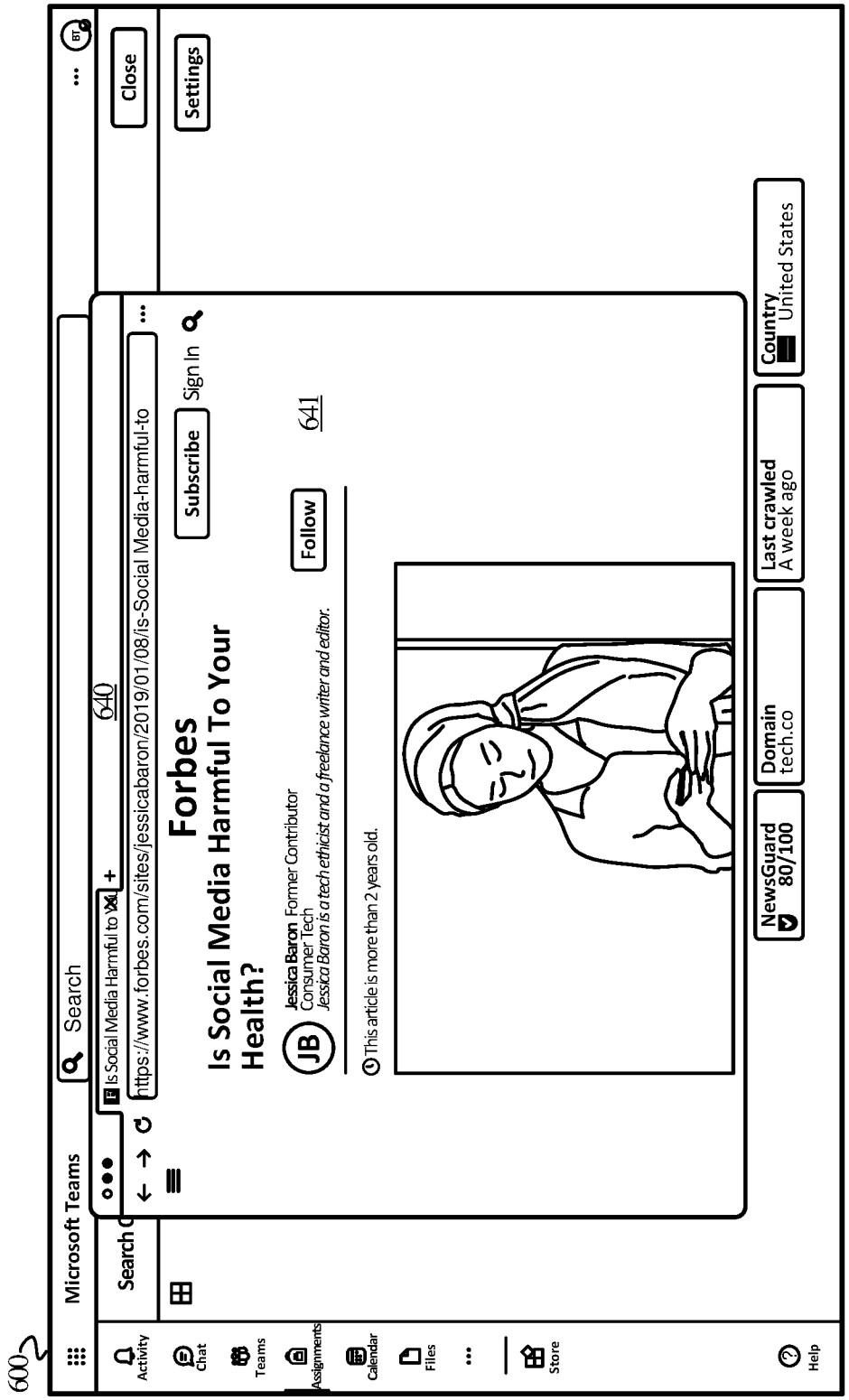
Figure 6G:
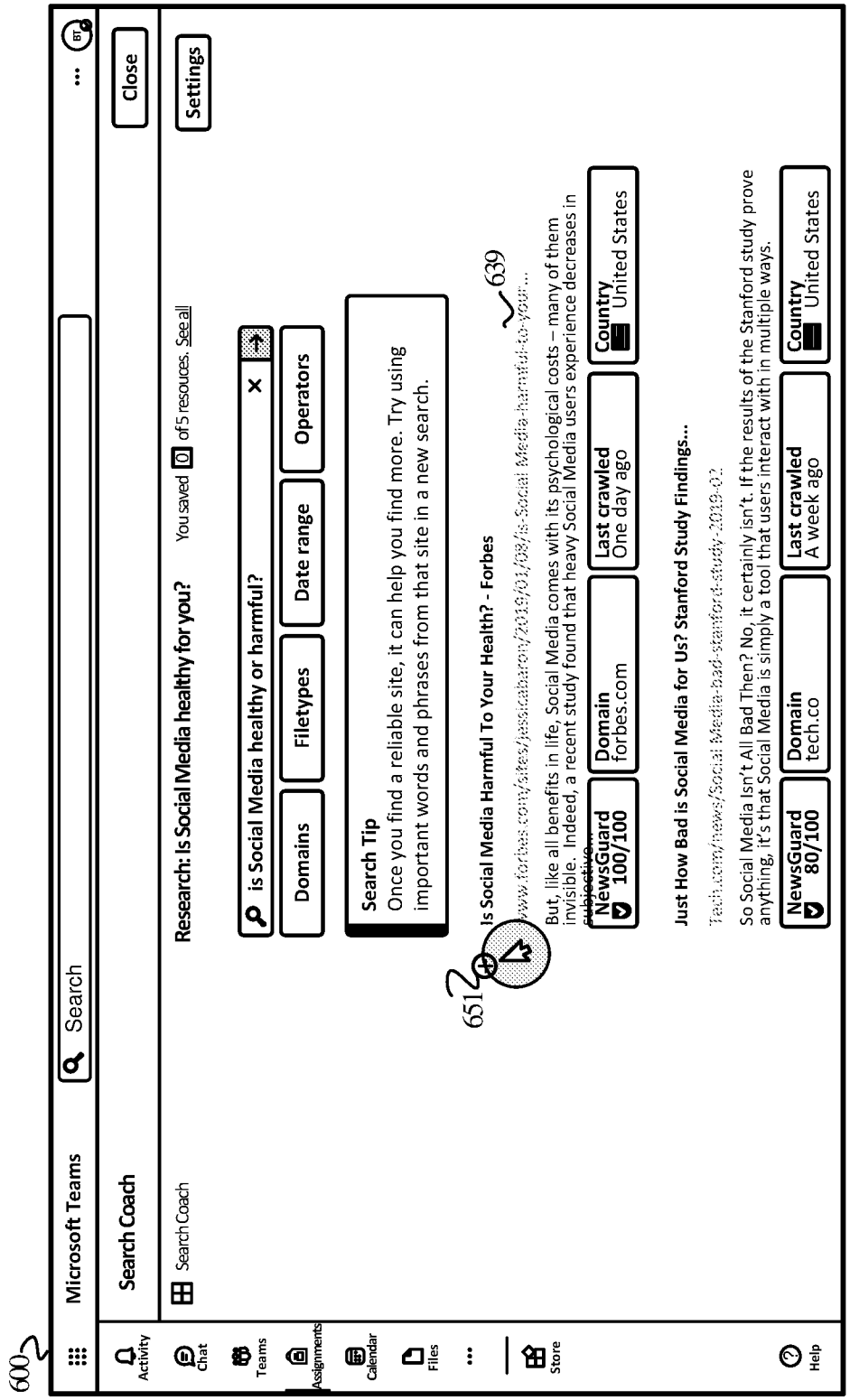

In FIG. 6F, a window 640 for a web browser application is rendered that includes the web page 641 associated with result 639. In some implementations, the web page 641 may be rendered in the context of search coach view 620, search coach page 621, or some other aspect of user interface 600 rather than in a separate window. The web page 641 includes the article referenced in the result 639 that interested the user. The student user evaluates the article and returns to user interface 600 in FIG. 6G.

Figure 6H:
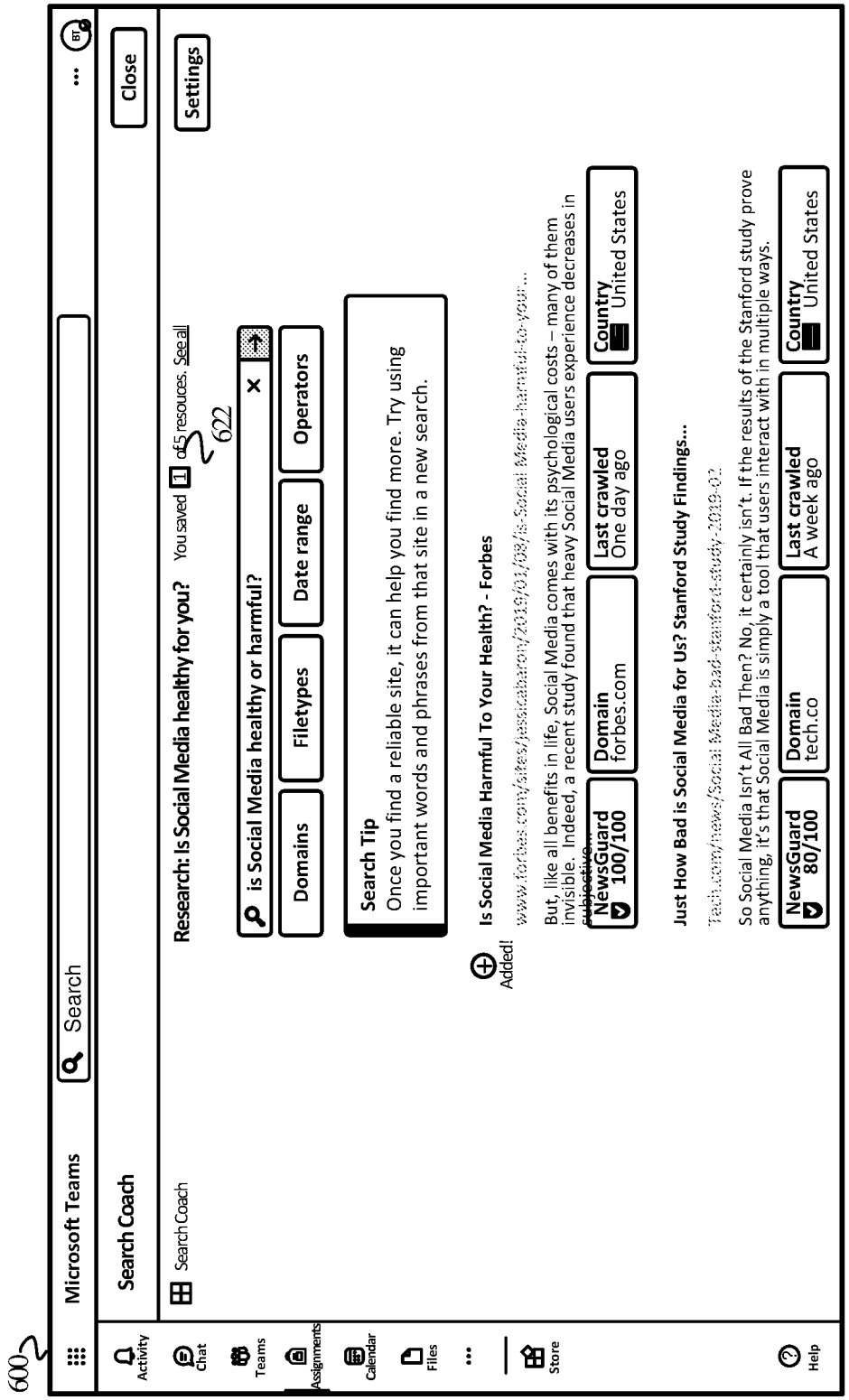

Having returned from viewing the web page, user interface 600 updates to include a button 651 displayed in association with result 639. Button 651 is selectable to add the resource associated with result 639 to the resource collection for the assignment. Button 651 has multiple states: an evaluated state and an added state. The evaluated state reflects that a given resource has been selected and viewed by the user, while the added state reflects that the user has selected resource to be included in the collection of resources. Here, button 651 is displayed initially in the evaluated state. The student user then proceeds to select the button, causing it to transition to the added state as illustrated in FIG. 6H. In FIG. 6H, button 651 has transitioned to the added state as evidenced by the addition of an "added!" caption below the button. Other visualizations are possible for indicating the state transition such as by changing the color, shading, size, or shape of button 651 or the result 539. In addition, resource count component 622 has been updated to reflect that a resource has been added to the resource collection.

Referring ahead to FIG. 9, user interface 900 illustrates an alternative implementation relative to the screen shot shown in FIG. 6H. In FIG. 9, user interface 900 includes button 901, which is representative of a button selectable to add a resource to a resource collection. Here, button 901 is shown in the added state (as opposed to the evaluated state) to indicate that the user has selected the corresponding resource for inclusion in resource citations.

User interface 900 also includes a side pane 903 through which a student user may review details of an assignment and the resources the student user as collected for the assignment. Side pane 903 includes a details section 905 that describes the instructions for the search assignment, as well as a resources section 907 for viewing and navigating details about the resources the student user has collected. The resources section 907 lists the resources collected for an assignment and includes a control 909 for navigating amongst the resources. Resources section 907 also includes an input box 909 where the student user can input text describing a reason(s) for selecting a given resource. The user can input reasons for selecting a given resource via input box 909 and can also edit the reasons via summary page 660 below.

Figure 6I:
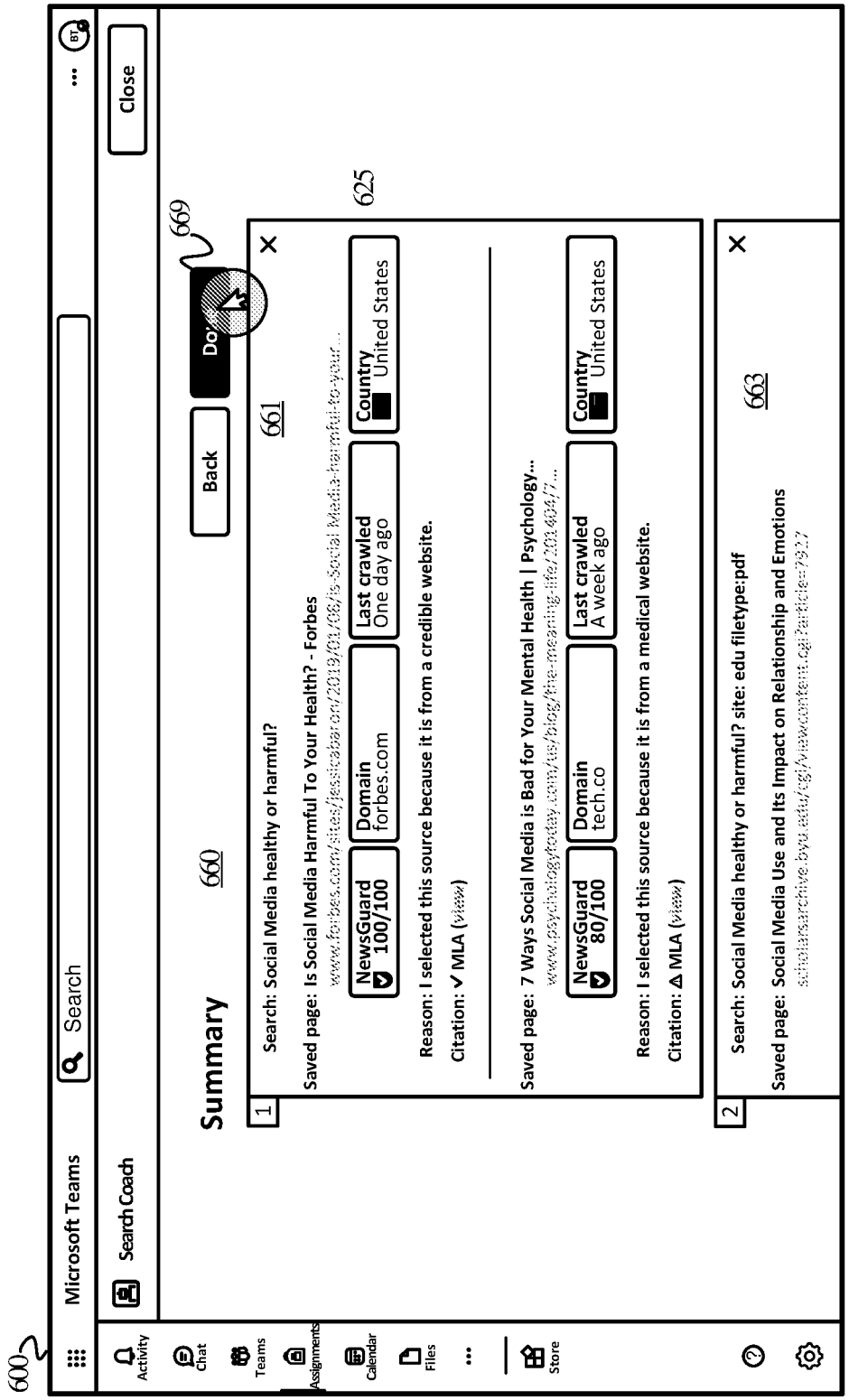

FIG. 6I illustrates a summary page 660 in user interface 600. Summary page 660 is representative of a page that includes a list of the resources that the student added to the resource collection for the assignment. The summary includes three resources in this example, two of which are represented in resource card 661, and one that is represented in resource card 663. Both resource cards provide a citation to the underlying resource (e.g., an article on a website), as well as reasons added by the user for why a given resource was selected for inclusion in the collection. Note also that each of the resource cards includes the search that was used to obtain the results. For instance, resource card 661 displays the search query: "Social Media healthy or harmful?" Resource card 663 displays the search query: "Social Media healthy or harmful?" along with filters limiting results to education sites and a specific document type. Summary page 660 allows the student to review their work product before returning to search assignment view 610 by selecting button 669.

Figure 6J:
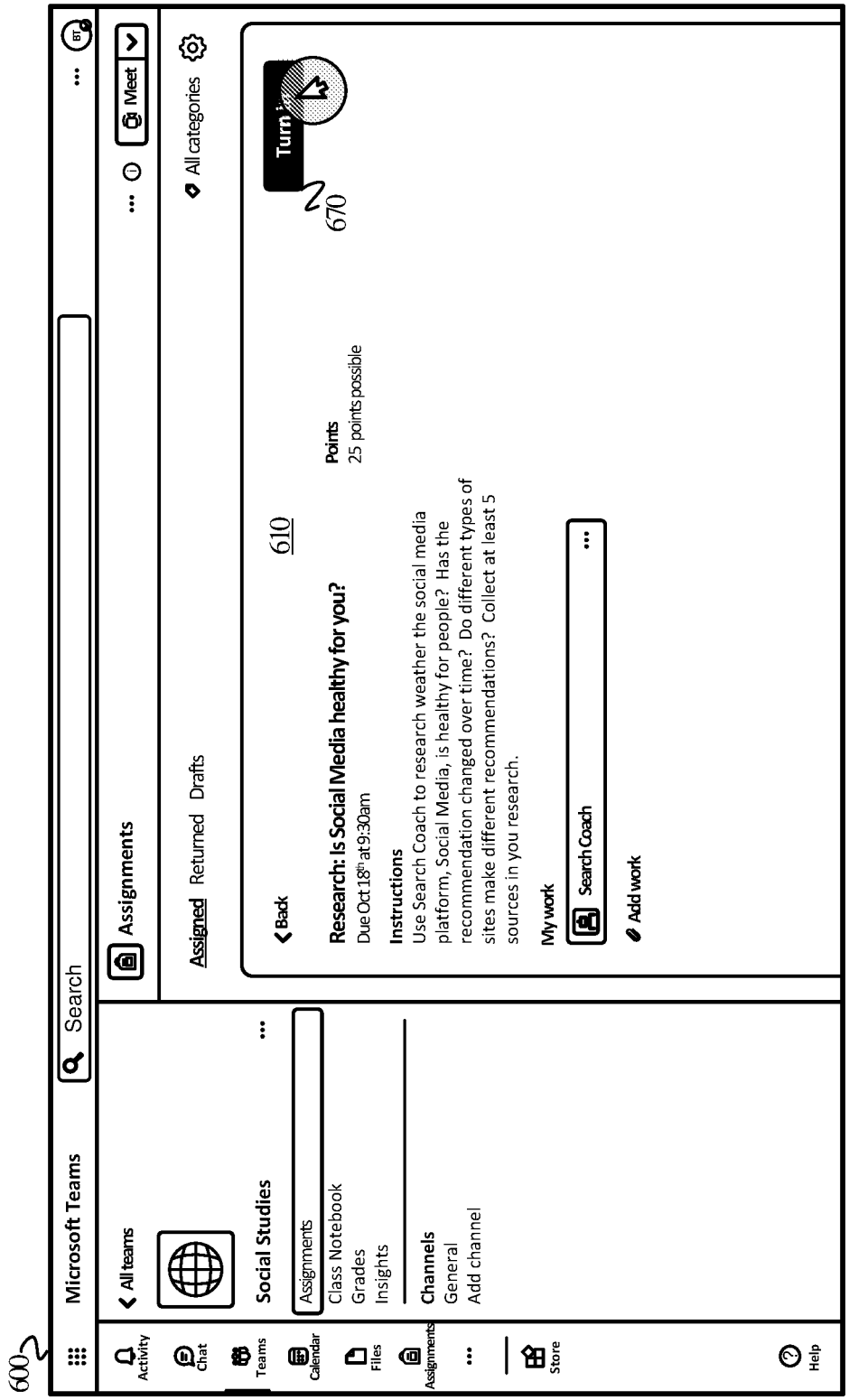

In FIG. 6J, the student user has returned to search assignment view 610. Here, the student can click on button 670 to turn in the assignment. Doing so causes the assignment to be turned in to the platform for the teacher to review and grade.

FIGS. 7A-7B illustrate the user experience of the teacher when reviewing and grading turn-in assignments. FIG. 7A illustrates user interface 500 in a continuation of the scenario illustrated in FIGS. 5A-5D. User interface 500 in FIG. 7A illustrates an assignments view 550 experienced by a teacher. Assignments view 550 includes a menu 551 of different types of assignments. A teacher may select an assigned tab to navigate to assigned assignments, a returned tab to navigate to assignments the teacher has returned to students, and a drafts tab for assignments in draft stage. Here, the user has selected the assigned tab resulting in a search assignment view 553 of the search assignment that was created and posted to the class.

Search assignment view 553 includes details about the assignment as well as a list of the students to whom the assignment was assigned. The student list includes the status of the assignment with respect to each student such as whether it has been turned in, started but not turned in, viewed but not started, or not yet viewed (not shown). The teacher determines to navigate to a turned-in version of the assignment submitted by a specific student by clicking on a link associated with the assignment. Here, the teacher clicks on the words "turned-in" with respect to Krystal's assignment, causing user interface 500 to transition to a summary view 570 of her assignment illustrated in FIG. 7B.

FIG. 7B illustrates a summary view 570 of the student's turned-in assignment. Summary view 570 includes the collection of resources evaluated and selected by the student, represented on resource card 571 and resource card 573. The teacher is able to easily view the resources that the student found to be compelling, as well as the student's stated reasons for including the resources. User interface 500 also includes a grading panel 580 where the teacher can provide feedback and allocate points. The teacher can navigate to other students via component 581 and can also return the assignment to the student via component 583.

Figure 8A:
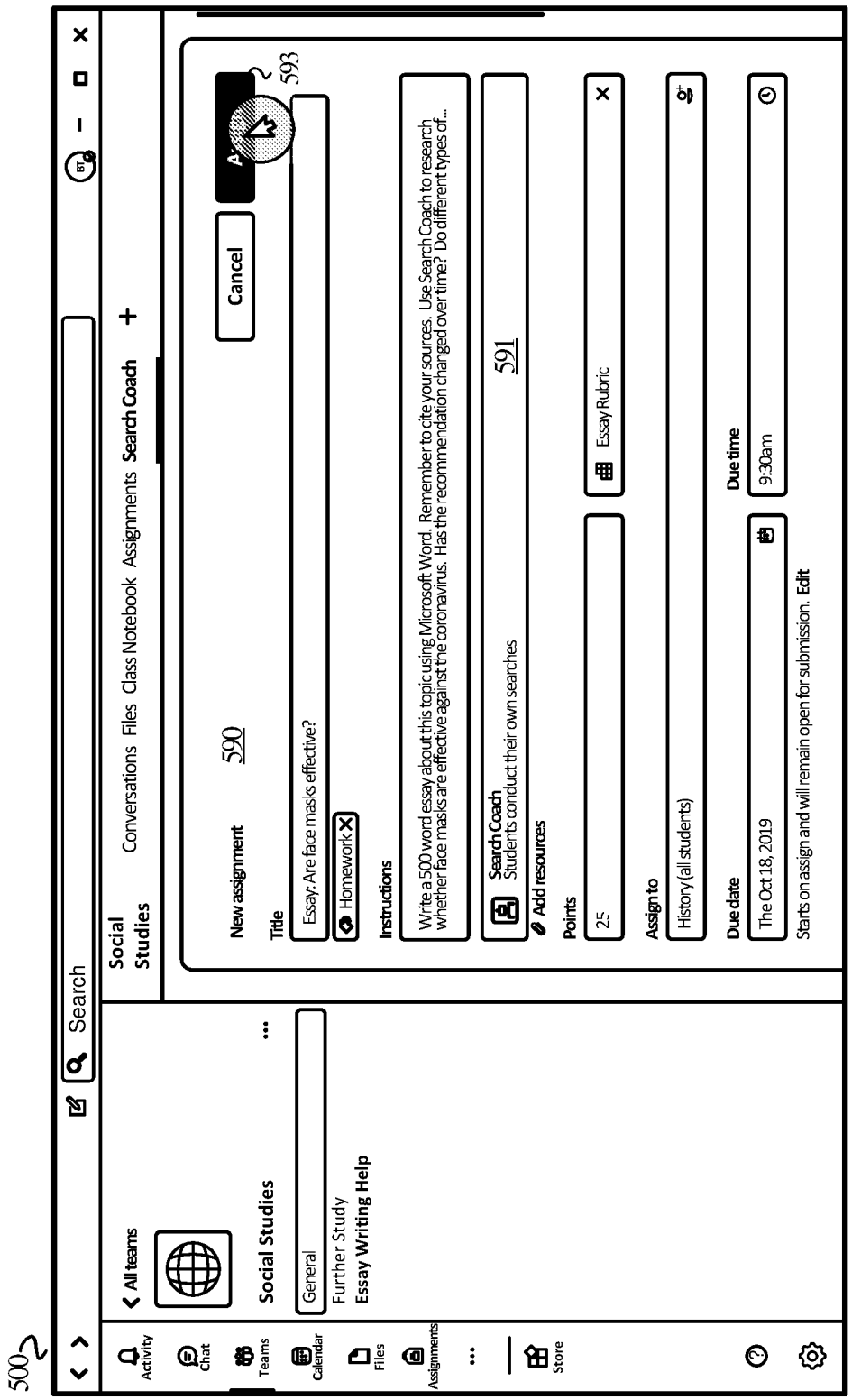
Figure 8B:
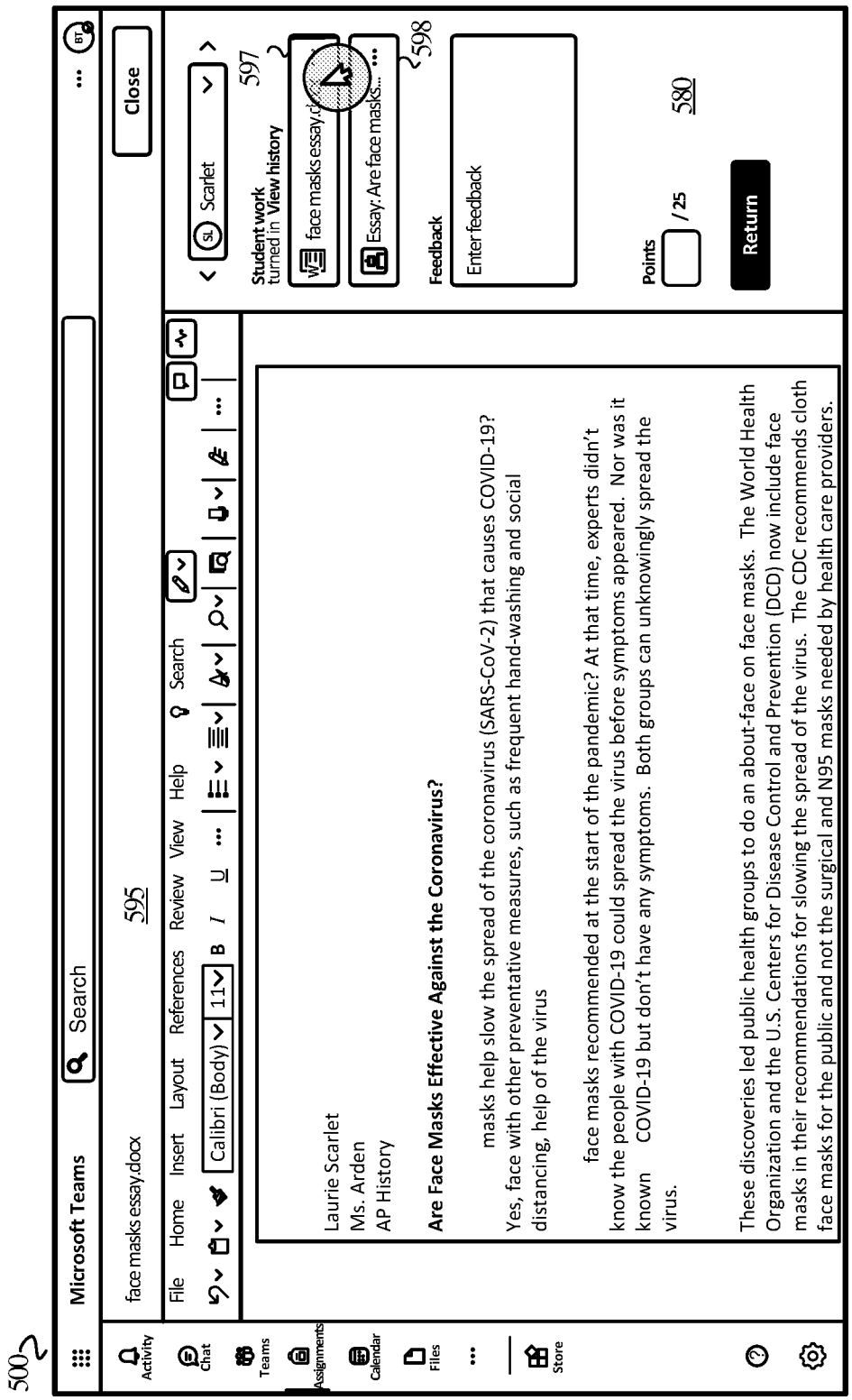

The search coach feature may be used in combination with a variety of other types of assignments. For example, in addition to assignments where a primary objective is searching, as illustrated in FIGS. 5A-5D, 6A-6J, and 7A-7B, the search coach may be used for assignments in which a primary objective is a skill other than searching (or in addition to searching), such as essay writing, presentation creation, or any other suitable learning objective, as illustrated in FIGS. 8A-8C. For instance, as illustrated in FIG. 8A, the teacher determines to create an essay writing assignment in user interface 500 via new assignment view 590. In new assignment view 590, the teacher defines the assignment including its title, instructions, points, and deadline. The teacher also adds the search coach tool as a resource for the assignment via component 591. Once the assignment has been fully defined, the teacher selects button 593 to assign the essay to the students in the class.

FIG. 8B illustrates turned-in view 595 in user interface 500 which illustrates a view provided to a teacher of a student's turned-in assignment. Here, turned-in view 595 of the assignment includes a version of a document opened in user interface 500 for the teacher to read and review. Grading panel 580 now includes components for two aspects of the essay assignment: the essay document itself, accessible via component 597, and the search summary for the essay, accessible via component 598. Here, the teacher has selected component 597. As such, the document is displayed in user interface 500 in the context of a suitable word processing application. In FIG. 8C, the teacher selects component 598, which transitions user interface 500 to summary view 570 described earlier with respect to FIG. 7B. It may be appreciated that panel 580 is not limited to the two components disclosed herein and other examples may include other components corresponding to other aspects of the essay assignment.

Referring ahead to FIG. 10, user interface 1000 illustrates a summary view 1001 provided to a teacher of a student's turned in assignment. Summary view 1001 is representative of an alternative to summary view 570 provided with respect to FIGS. 7B and 7E. Summary view 1001 provides a teacher with a summary of a student's search progress. In particular, summary view 1001 includes search view 1003, which provides a list of searches performed by a student in association with an assignment, as well as details about each search. For example, search view 1003 includes the terms used in each search, the filters used in each search (if any), how many websites associated with the search results were opened, and how many resources were saved from each set of search results. The teacher can quickly and easily gain an appreciation of the student's ability and progress with respect to searching from search view 1003.

Referring to FIG. 11, computing device 1101 is representative of any system or collection of systems in which the various processes, programs, services, and scenarios disclosed herein may be implemented. Examples of computing device 1101 include, but are not limited to, desktop and laptop computers, tablet computers, mobile computers, mobile phones, and wearable devices. Examples may also include server computers, web servers, cloud computing platforms, and data center equipment, as well as any other type of physical or virtual server machine, container, and any variation or combination thereof.

Computing device 1101 may be implemented as a single apparatus, system, or device or may be implemented in a distributed manner as multiple apparatuses, systems, or devices. Computing device 1101 includes, but is not limited to, processing system 1102, storage system 1103, software 1105, communication interface system 1107, and user interface system 1109 (optional). Processing system 1102 is operatively coupled with storage system 1103, communication interface system 1107, and user interface system 1109.

Processing system 1102 loads and executes software 1105 from storage system 1103. Software 1105 includes and implements process 1106, which is representative of the processes discussed with respect to the preceding Figures, such as process 200. When executed by processing system 1102, software 1105 directs processing system 1102 to operate as described herein for at least the various processes, operational scenarios, and sequences discussed in the foregoing implementations. Computing device 1101 may optionally include additional devices, features, or functionality not discussed for purposes of brevity.

Referring still to FIG. 11, processing system 1102 may comprise a micro-processor and other circuitry that retrieves and executes software 1105 from storage system 1103. Processing system 1102 may be implemented within a single processing device but may also be distributed across multiple processing devices or sub-systems that cooperate in executing program instructions. Examples of processing system 1102 include general purpose central processing units, graphical processing units, application specific processors, and logic devices, as well as any other type of processing device, combinations, or variations thereof.

Storage system 1103 may comprise any computer readable storage media readable by processing system 1102 and capable of storing software 1105. Storage system 1103 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1103 may also include computer readable communication media over which at least some of software 1105 may be communicated internally or externally. Storage system 1103 may be implemented as a single storage device but may also be implemented across multiple storage devices or sub-systems co-located or distributed relative to each other. Storage system 1103 may comprise additional elements, such as a controller, capable of communicating with processing system 1102 or possibly other systems.

Software 1105 (including insights process 1106) may be implemented in program instructions and among other functions may, when executed by processing system 1102, direct processing system 1102 to operate as described with respect to the various operational scenarios, sequences, and processes illustrated herein. For example, software 1105 may include program instructions for implementing learning platforms with enhanced search assignments as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1105 may include additional processes, programs, or components, such as operating system software, virtualization software, or other application software. Software 1105 may also comprise firmware or some other form of machine-readable processing instructions executable by processing system 1102.

In general, software 1105 may, when loaded into processing system 1102 and executed, transform a suitable apparatus, system, or device (of which computing device 1101 is representative) overall from a general-purpose computing system into a special-purpose computing system customized to support learning platform features, functionality, and user experiences. Indeed, encoding software 1105 on storage system 1103 may transform the physical structure of storage system 1103. The specific transformation of the physical structure may depend on various factors in different implementations of this description. Examples of such factors may include, but are not limited to, the technology used to implement the storage media of storage system 1103 and whether the computer-storage media are characterized as primary or secondary storage, as well as other factors.

For example, if the computer readable storage media are implemented as semiconductor-based memory, software 1105 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1107 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 1101 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit." "module" or "system." Furthermore, aspects of the present invention may take the form of a computer program product embodied in one or more computer readable medium(s) having computer readable program code embodied thereon.

It may be appreciated that, while the inventive concepts disclosed herein are discussed in the context of insights applications and services, they apply as well to other contexts such as productivity applications and services, gaming applications and services, virtual and augmented reality applications and services, business applications and services, and other types of software applications, services, and environments.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
   one or more computer readable storage media;
   one or more processors operatively coupled with the one or more computer readable storage media; and
   an application comprising program instructions stored on the one or more computer readable storage media that, when executed by the one or more processors, direct the computing apparatus to at least:
   display a view of a search assignment in a user interface to a learning platform;
   receive user input comprising search terms associated with the search assignment;
   generate a query based on the user input and submit the query to a search engine;
   display search results received from the search engine in response to the submitted query;
   monitor for user evaluation of resources provided in the search results;
   in response to the user evaluation of a resource provided in the search results, update the user interface to include an option selectable for adding the resource to a collection of resources for the search assignment, wherein the option comprises a graphical button having multiple states comprising an evaluated state and an added state, wherein:
   the evaluated state reflects that the resource has been selected and viewed by a user; and
   the added state reflects that the user has selected the resource to be included in the collection of resources; and
   in response to receiving a selection of the option with respect to the resource, add the resource to the collection of resources.

2. The computing apparatus of claim 1 wherein the search assignment requires a user to conduct online research in a search assignment mode of the learning platform and turn in the collection of resources saved during the online research.

3. The computing apparatus of claim 1, wherein the program instructions further direct the computing apparatus to, in response to receiving a selection of an option selectable for turning in the search assignment, submit at least the collection of resources for instructor review.

4. The computing apparatus of claim 1 wherein, in response to a selection of a control in the user interface, the program instructions further direct the computing apparatus to transition the user interface from a classroom mode to a search assignment mode.

5. The computing apparatus of claim 4 wherein the classroom mode includes the view of the search assignment, and wherein the view of the search assignment includes details of the search assignment and the control selectable for entering into the search assignment mode.

6. The computing apparatus of claim 5 wherein the search assignment mode comprises a search coach view, wherein the search coach view includes an indication of the search assignment and components of a search coach tool, wherein the components include a user interface to the search engine via which the user supplies the user input and tool components for constructing the user input.

7. The computing apparatus of claim 6 wherein the details of the search assignment specify a topic and a requirement to identify a minimum number of resources relevant to the topic.

8. One or more computer readable storage media having program instructions stored thereon that, when executed by one or more processors of a computing device, direct the computing device to at least:
   display a view of a search assignment in a user interface to a learning platform;
   receive user input comprising search terms associated with the search assignment;
   generate a query based on the user input and submit the query to a search engine;
   display search results received from the search engine in response to the submitted query;
   monitor for user evaluation of resources provided in the search results;
   in response to the user evaluation of a resource provided in the search results, update the user interface to include an option selectable for adding the resource to a collection of resources for the search assignment, wherein the option comprises a graphical button having multiple states comprising an evaluated state and an added state, wherein:
   the evaluated state reflects that the resource has been selected and viewed by a user; and
   the added state reflects that the user has selected the resource to be included in the collection of resources; and in response to a user selection of the option with respect to the resource, add the resource to the collection of resources.

9. The one or more computer readable storage media of claim 8 wherein the search assignment requires a user to conduct online research in a search assignment mode of the learning platform and turn in the collection of resources saved during the online research.

10. The one or more computer readable storage media of claim 8, wherein the program instructions further direct the computing device to, in response to receiving a selection of an option selectable for turning in the search assignment, submit at least the collection of resources for instructor review.

11. The one or more computer readable storage media of claim 8 wherein, in response to a selection of a control in the user interface, the program instructions further direct the computing device to transition the user interface from a classroom mode to a search assignment mode.

12. The one or more computer readable storage media of claim 11 wherein the classroom mode includes the view of the search assignment, and wherein the view of the search assignment includes details of the search assignment and the control selectable for entering into the search assignment mode.

13. The one or more computer readable storage media of claim 12 wherein the search assignment mode comprises a search coach view, wherein the search coach view includes an indication of the search assignment and components of a search coach tool, wherein the components include a user interface to the search engine via which the user supplies the user input and tool components for constructing the user input.

14. The one or more computer readable storage media of claim 13 wherein the details of the search assignment specify a topic and a requirement to identify a minimum number of resources relevant to the topic.

15. A computer implemented method of operating an online learning platform, the method comprising:
on a first computer associated with an instructor:
defining an assignment, and assigning the assignment to a group of students, wherein the assignment includes a topic and a requirement to identify a minimum number of resources relevant to the topic;
on a second computer associated with a student, of the group of students:
displaying a view of the assignment in a user interface;
receiving search terms associated with the assignment;
generating a query based on the search terms and submitting the query to a search engine;
displaying search results received from the search engine in response to the submitted query;
monitoring for user evaluation of resources provided in the search results;
in response to the user evaluation of a resource provided in the search results, updating the user interface to include an option selectable for adding the resource to a collection of resources for the assignment, wherein the option comprises a graphical button having multiple states comprising an evaluated state and an added state, wherein:
the evaluated state reflects that the resource has been selected and viewed by a user; and
the added state reflects that the user has selected the resource to be included in the collection of resources; and
in response to a user selection of the option with respect to the resource, adding the resource to the collection of resources.

16. The method of claim 15 wherein the assignment requires the student to conduct online research related to the topic in an assignment mode on the second computer and turn in the collection of resources saved during the online research.

17. The method of claim 15 further comprising, in response to receiving a selection of an option selectable for turning in the assignment, submitting at least the collection of resources for review by the instructor.

18. The method of claim 15 further comprising, in response to a selection of a control in the user interface, transitioning the user interface from a classroom mode to a search assignment mode.

19. The method of claim 18 wherein the classroom mode includes the view of the assignment, and wherein the view of the assignment includes details of the assignment and the control selectable for entering into the search assignment mode.

20. The method of claim 19 wherein the search assignment mode comprises a search view, wherein the search view includes an indication of the assignment and components of a search coach tool, wherein the components include a user interface to the search engine via which the user supplies user input comprising the search terms and tool components for constructing the user input.

* * * * *